US012750821B2

(12) United States Patent
Abdelrahman Mostafa et al.

(10) Patent No.: US 12,750,821 B2
(45) Date of Patent: Sep. 29, 2026

(54) UPLINK GRANT ADJUSTMENT TECHNIQUES IN CELLULAR NETWORKS

(71) Applicant: APPLE INC., Cupertino, CA (US)

(72) Inventors: Amr Abdelrahman Yousef Abdelrahman Mostafa, Munich (DE); Panagiotis Botsinis, Munich (DE); Tarik Tabet, Carlsbad, CA (US); Christian Hofmann, Munich (DE); Sameh M. Eldessoki, Munich (DE)

(73) Assignee: Apple Inc., Cupertino, CA (US)

(*) Notice: Subject to any disclaimer, the term of this patent is extended or adjusted under 35 U.S.C. 154(b) by 206 days.

(21) Appl. No.: 18/535,943

(22) Filed: Dec. 11, 2023

(65) Prior Publication Data

US 2024/0244591 A1 Jul. 18, 2024

Related U.S. Application Data

(60) Provisional application No. 63/438,712, filed on Jan. 12, 2023.

(51) Int. Cl.
*H04W 72/04* (2023.01)

(52) U.S. Cl.
CPC .................................. *H04W 72/04* (2013.01)

(58) Field of Classification Search
CPC ............ H04W 72/23; H04W 72/0446; H04W 72/1268; H04W 72/21; H04W 74/0833; H04W 74/006; H04W 72/20; H04W 72/56; H04W 88/02; H04W 72/535; H04W 48/12; H04W 74/004; H04W 72/115; H04W 28/0278; H04W 72/02
See application file for complete search history.

(56) References Cited

U.S. PATENT DOCUMENTS

2015/0078294 A1* 3/2015 Yang ..................... H04W 72/21 370/329
2018/0324768 A1* 11/2018 Shaheen ............... H04L 5/0053
2021/0321424 A1* 10/2021 Awoniyi-Oteri ...... H04L 1/1822
2021/0360686 A1* 11/2021 Taherzadeh Boroujeni ................ H04W 72/23
2023/0300929 A1* 9/2023 Bressanelli ........... H04W 72/21 370/329
2023/0403698 A1* 12/2023 Wang ................ H04W 72/0446
2024/0040578 A1* 2/2024 Amaya-Gonzalez ........................ H04W 52/0245

OTHER PUBLICATIONS

Technical Specification entitled, 3rd Generation Partnership Project; Technical Specification Group Radio Access Network; Evolved Universal Terrestrial Radio Access (E-UTRA); Physical layer; Measurements (Release 17); 3GPP TS 36.214 V17.0.0 (Mar. 2022) in 26 pages.

Technical Specification entitled 3rd Generation Partnership Project; Technical Specification Group Radio Access Network; Evolved Universal Terrestrial Radio Access (E-UTRA); Physical layer procedures (Release 17); 3GPP TS 36.213 V17.3.0 (Sep. 2022) in 584 pages.

(Continued)

*Primary Examiner* — Olumide Ajibade Akonai
(74) *Attorney, Agent, or Firm* — Kilpatrick Townsend & Stockton LLP

(57) ABSTRACT

The present application relates to devices and components, including apparatus, systems, and methods for uplink (UL) grant adjustment in wireless networks.

14 Claims, 18 Drawing Sheets

(56) References Cited

OTHER PUBLICATIONS

Technical Specification entitled 3rd Generation Partnership Project; Evolved Universal Terrestrial Radio Access (E-UTRA); Multiplexing and channel coding (Release 17); 3GPP TS 36.212 V17.1.0 (Mar. 2022) in 257 pages.

Technical Specification entitled 3rd Generation Partnership Project; Technical Specification Group Radio Access Network; Evolved Universal Terrestrial Radio Access (E-UTRA); Physical channels and modulation (Release 17); 3GPP TS 36.211 V17.2.0 (Jun. 2022) in 250 pages.

Technical Specification entitled 3rd Generation Partnership Project; Technical Specification Group Radio Access Network; NR; Physical channels and modulation (Release 17); 3GPP TS 38.211 V17.3.0 (Sep. 2022) in 136 pages.

Technical Specification entitled 3rd Generation Partnership Project; Technical Specification Group Radio Access Network; NR; Physical layer procedures for data (Release 17); 3GPP TS 38.214 V17.3.0 (Sep. 2022) in 232 pages.

Technical Specification entitled 3rd Generation Partnership Project; Technical Specification Group Radio Access Network; NR; Physical layer procedures for control (Release 17); 3GPP TS 38.213 V17.3.0 (Sep. 2022) in 260 pages.

Technical Specification entitled 3rd Generation Partnership Project; Technical Specification Group Radio Access Network; NR; Multiplexing and channel coding (Release 17); 3GPP TS 38.212 V17.3.0 (Sep. 2022) in 201 pages.

* cited by examiner

1100

1110

| Field | Number of bits |
| --- | --- |
| MCS | a |
| Antenna ports(s) | b |

1120

| Field | Number of bits |
| --- | --- |
| Number of codeblocks with new data | c |

1130

| Field | Number of bits |
| --- | --- |
| Frequency domain resource assignment | d |
| Time domain resource assignment | e |

FIG. 11

UPLINK GRANT ADJUSTMENT TECHNIQUES IN CELLULAR NETWORKS

CROSS-REFERENCES TO OTHER APPLICATIONS

This application claims priority to U.S. Provisional Application No. 63/438,712, for "UPLINK GRANT ADJUSTMENT TECHNIQUES IN CELLULAR NETWORKS," filed on Jan. 12, 2023, which is herein incorporated by reference in its entirety for all purposes.

TECHNICAL FIELD

This application related generally to communication networks and, in particular, to technologies for uplink (UL) resource allocations in such networks.

BACKGROUND

In some wireless networks, a base station allocates uplink (UL) resources to a user equipment (UE). The base station allocates UL resources by sending a downlink (DL) control message to the UE. The information in the DL control message that grants the UE the UL resources is called the UL grant. Improvements in the efficient allocation of uplink resources are desired.

BRIEF DESCRIPTION OF THE DRAWINGS

FIG. 11 illustrates system parameters in accordance with some embodiments.

DETAILED DESCRIPTION

Figure 1:
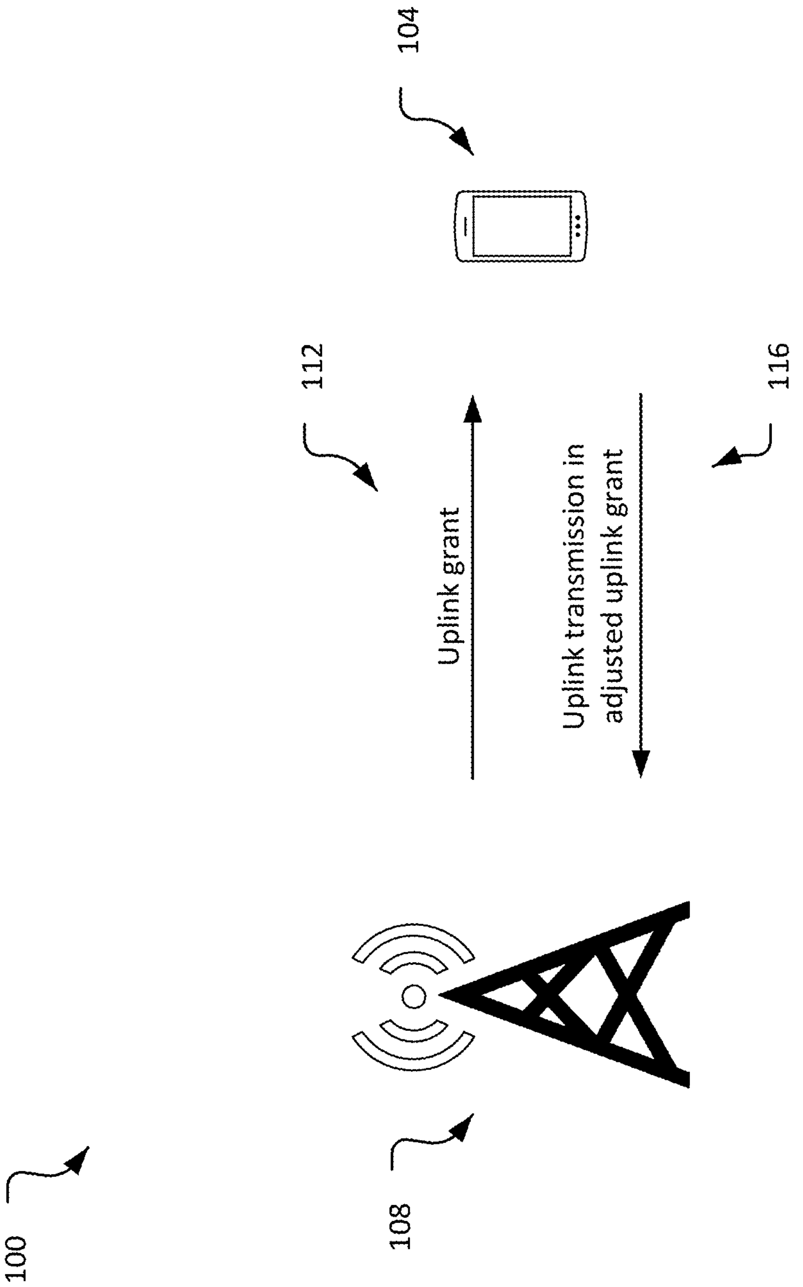
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth, such as particular structures, architectures, interfaces, and/or techniques, in order to provide a thorough understanding of the various aspects of some embodiments. However, it will be apparent to those skilled in the art having the benefit of the present disclosure that the various aspects of the various aspects may be practiced in other examples that depart from these specific details. In certain instances, descriptions of well-known devices, circuits, and methods are omitted so as not to obscure the description of the various aspects with unnecessary detail. For the purposes of the present document, the phrase "A or B" means (A), (B), or (A and B), and the phrase "based on A" means "based at least in part on A," for example, it could be "based solely on A," or it could be "based in part on A."

The following is a glossary of terms that may be used in this disclosure.

The term "circuitry" as used herein refers to, is part of, or includes hardware components, such as an electronic circuit, a logic circuit, a processor (shared, dedicated, or group), or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), and/or digital signal processors (DSPs), that are configured to provide the described functionality. In some aspects, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these aspects, the combination of hardware elements and program code may be referred to as a particular type of circuitry.

The term "processor circuitry" as used herein refers to, is part of, or includes circuitry capable of sequentially and automatically carrying out a sequence of arithmetic or logical operations; or recording, storing, or transferring digital data. The term "processor circuitry" may refer to an application processor; baseband processor; central processing unit (CPU); graphics processing unit; single-core processor; dual-core processor; triple-core processor; quad-core processor; or any other device capable of executing or otherwise operating computer-executable instructions, such as program code; software modules; or functional processes.

The term "interface circuitry," as used herein, refers to, is part of, or includes circuitry that enables the exchange of information between two or more components or devices. The term "interface circuitry" may refer to one or more hardware interfaces; for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to and may be referred to as the client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device, including a wireless communications interface.

The term "computer system," as used herein, refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to a computer, storage, or network resource provided by physical hardware element(s). A "virtualized resource" may refer to a computer, storage, or network resource provided by virtualization infrastructure to an application, device, system, etc. The term "network resource" or "communication resource" may refer to resources that are accessible by computer devices/systems via a communications network. The term "system resources" may refer to any kind of shared entity to provide services and may include computing or network resources. System resources may be considered as a set of coherent functions, network data objects, or services accessible through a server where such system resources reside on a single host or multiple hosts and are clearly identifiable.

The term "channel," as used herein, refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link," as used herein, refers to a connection between two devices for the purpose of transmitting and receiving information.

The terms "instantiate," "instantiation," and the like, as used herein, refer to the creation of an instance. An "instance" also refers to a concrete occurrence of an object, which may occur, for example, during the execution of program code.

The term "connected" may mean that two or more elements at a common communication protocol layer have an established signaling relationship with one another over a communication channel, link, interface, or reference point.

The term "network element," as used herein, refers to physical or virtualized equipment or infrastructure used to provide wired or wireless communication network services. The term "network element" may be considered synonymous with or referred to as a networked computer, networking hardware, network equipment, network node, virtualized network function, or the like.

The term "information element" refers to a structural element containing one or more fields. The term "field" refers to individual contents of an information element or a data element that contains content. An information element may include one or more additional information elements.

FIG. 1 illustrates a network environment 100 in accordance with some embodiments. The network environment 100 may include the UE 104 coupled with the base station (BS) 108 of a radio access network (RAN). In some embodiments, the BS 108 is a next-generation node B (gNB) that provides one or more 3GPP New Radio (NR) cells. In other embodiments, the BS 108 is an evolved node B (eNB) that provides one or more Long Term Evolution (LTE) cells. The air interface over which the UE 104 and the BS 108 communicate may be compatible with 3GPP technical specifications, such as those that define Fifth Generation (5G) NR or later system standards (e.g., Sixth generation standards).

The BS 108 includes hardware and software components needed to send control and data to the UE 104 and receive control and data from the UE 104. In one example, the BS 108 includes hardware and software components needed to operate the wireless network, allocate network resources, and manage UEs. Network resource allocation includes allocating time, frequency, and space resources for uplink (UL) and downlink (DL) transmissions, power control, scheduling, and admission control. In one example, the BS 108 is also referred to as the network. Similarly, the UE 104 includes hardware and software components needed to send control and data to the BS 108 and to receive control and data from the BS 108.

In one example, the BS 108 allocates UL resources that the UE 104 uses for UL transmission of control and data. In one example implementation, the BS 108 sends downlink control information (DCI), e.g., DCI format 0 or DCI format 4, to allocate UL resources in accordance with 3GPP Technical Specifications (TS) 36.211 v17.2.0 (2022-06-23), 36.212 v17.1.0 (2022-04-01), 36.213 v17.3.0 (2022-09-21), 36.214 v17.0.0 (2022-03-31) and TS 38.211 v17.3.0 (2022-09-21), 38.212 v17.3.0 (2022-09-21), 38.213 v17.3.0 (2022-09-21), 38.214 v17.3.0 (2022-09-21). The resources allocated by the DCI include frequency-domain resource, time-domain resource, modulation and coding scheme (MCS), number of antenna ports, number of layers, and the number of codeblocks with new data. In one example, the UL grant's DCI includes a bitmap indicating the resource block groups (RBGs) allocated to the UE 104 for UL transmission. The resources allocated for UL transmission are also referred to as the UL grant. In one example, the BS 108 sends the DCI on the physical downlink control channel (PDCCH).

In one example, the UE 104 and the BS 108 implement a communication protocol stack in accordance with the 3GPP specification. The protocol stack includes a physical layer, also referred to as Layer 1. The physical layer is the interface between the UE 104 and the BS 108. The physical layer interfaces the Medium Access Control (MAC) sub-layer of Layer 2 and the Radio Resource Control (RRC) layer of Layer 3. In one example, when the UE 104 transmits data (UL data) to the BS 108, the MAC provides the packet of data to the physical layer, and the physical layer processes and sends the packet of data to the BS 108. In one example, the packet of data is referred to as a transport block (TB).

In some instances, the network may facilitate the transmission of data packets with different reliabilities. For example, consider a first group of packets (e.g., Group A)

that is to be transmitted with normal reliability (e.g., corresponding to a block level error rate (BLER) of 10%) and another group of packets (e.g., Group B) that is to be transmitted with higher reliability (e.g., a BLER of 2%). In some instances, the Group A packets and the Group B packets may both include user-plane packets. In other instances, the Group A packets may include signaling UL data (e.g., a measurement report for a handover), and the Group B packets may include user-plane UL data.

A wireless system may implement several schemes to send data packets with higher reliability. In the first scheme, the transmitter sends the same data multiple times on different carriers, e.g., carrier aggregation (CA) duplication and packet data convergence protocol (PDCP) duplication. In a second scheme, the transmitter sends the same data multiple times on the same carrier with different redundancy versions. This may be based on transmission time interval (TTI) bundling and slot aggregation features in 3GPP, for example. In a third scheme, the transmitter sends the data with a highly reliable transmission scheme, e.g., a modulation and channel coding scheme (MCS).

Existing networks may have difficulty achieving the second and third schemes in an efficient manner. In these networks, the UL grant is used to serve pending data on all radio bearers/logical channels in a UE. Therefore, by following a logical channel prioritization protocol in the MAC layer, all pending UL data in the UE would be served with the same reliability level without any differentiation. If all of the pending UL data is served with high reliability, radio resources may be wasted. If, on the other hand, all of the pending UL data is served with low/normal reliability, the important data may not be transmitted with the desired higher reliability.

The UE 104 may receive an indication of a UL grant 112 from the BS 108 via DCI, for example. The uplink grant 112 may include more UL resources than needed for transmitting UL data available at the UE 104. The UE 104 may then compute a transport block that includes the UL data and padding for the extra bytes for which there is no UL data to be filled. For example, the MAC layer computes the transport block size (in the number of bits that the transport block holds), creates a transport block, maps or loads the UL data into the transport block, and inserts bits with logical value zero in the remaining bits of the transport block that are not filled by the UL data. Padding the transport block is also referred to as zero padding. Zero padding wastes radio resources that could have been utilized more efficiently for other purposes.

The BS 108 may receive buffer status reports (BSRs) from active UEs. Based on the BSRs, the network or the BS 108 may determine that it has more resources than what is required by active UEs. When the BS 108 has more resources than required by the UEs, the BS 108 may assign a big UL grant value to accommodate as much pending data in the UL as possible to minimize latency in serving UL data from the UEs.

The BSR may represent a range between minimum and maximum values. The BS 108 may assign uplink resources corresponding to the maximum value of the range to allow the UE 104 to send all pending data. The UE 104 uses padding (the number of padding bits equals the assigned max value minus pending UL data) to fill the transport block.

In some instances, extra UL resources may be caused by the UE 104 discarding UL packets. For example, packet data convergence protocol (PDCP) discard functionality may discard certain UL packets. Discarding packets may result in the UE 104 having less UL data than what is reported in the BSR, and a UL grant based on the reported BSR would require zero padding.

In some instances, inefficient network scheduling at the BS 108, e.g., inefficient scheduling due to analog beamforming, results in the need for zero padding. In another example, split resource blocks (RBs) scheduling across cell groups (CGs) and inaccuracy in synchronizing the exact amount of pending data in the UE 104 requires zero padding.

The UE 104 may utilize UL grant adjustment to increase the reliability of transmission and improve the utilization of the network resources. For example, with reference to FIG. 1, the UE 104 may receive an indication of an uplink grant from the BS 108 at 112. The UE 104 may determine if the uplink grant is associated with extra uplink resources and perform an uplink transmission using an adjusted uplink grant at 116. The adjusted uplink grant may be autonomously generated by the UE 104 or as a result of a network-assisted adjustment.

Embodiments of the present disclosure provide UL grant adjustments that enable UL data differentiation and padding avoidance. In particular, when the UE 104 receives an assigned UL grant and determines the conditions for UL grant adjustment are fulfilled, the UE 104 may initiate a UL grant adjustment based on the nature of the pending UL data (e.g., remaining amount of data, data reliability type, etc.). The conditions for UL grant adjustment may be based on information associated with the assigned grant, pre-configured RRC or MAC conditions, conditions defined in 3GPP TSs, etc. The UL grant adjustments may enable UL data reliability differentiation or padding avoidance as follows.

Figure 2:
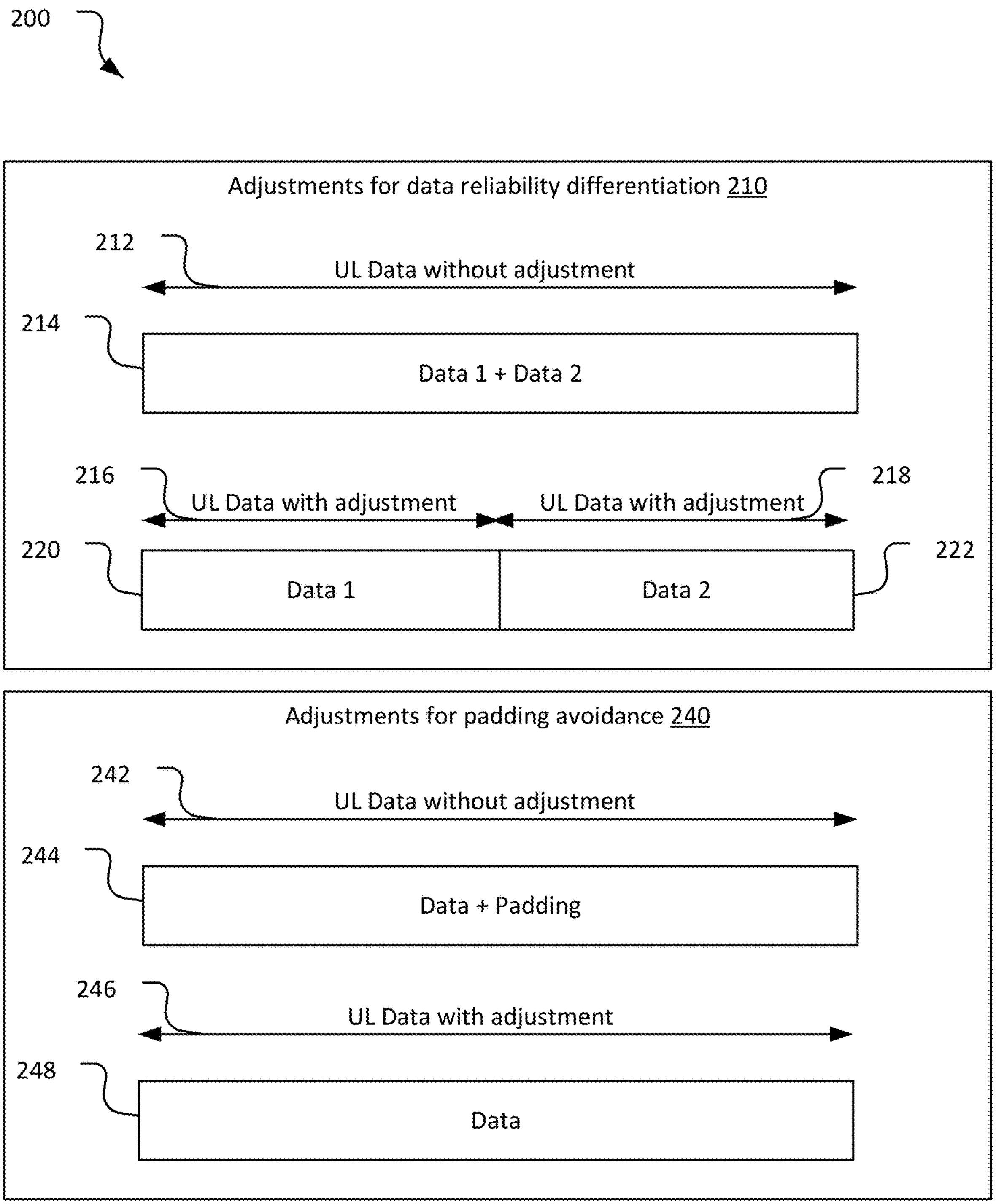
FIG. 2 illustrates uplink grant adjustments in accordance with some embodiments.

FIG. 2 illustrates uplink grant adjustments 200 in accordance with some embodiments. In one example, uplink grant adjustments 200 include adjustments for data reliability differentiation 210. In one example, uplink grant adjustments 200 include adjustments for padding avoidance 240.

Adjustment to the UL grant includes one or both adjustments to the UL resources and the transmission scheme. UL resources may include time and frequency resources. The transmission scheme may include one or more of: the MCS, the number of antenna ports, the number of layers, and the number of codeblocks with new data. The UE 104 uses the parameters of the transmission scheme to compute the transport block size. The transport block size determines the number of bits in a transport block that the MAC layer passes to the physical layer. In one example, the UE 104 uses the procedure in 3GPP TS 36.213 and 38.213 to determine the transport block size.

The UE 104 may initiate UL grant adjustment based on the requirements of pending UL data. The requirements of pending data include but are not limited to quality of service (QoS) requirements, reliability requirements, and priorities associated with the data. In one example, the UE 104 adjusts or requests the BS 108 to adjust the UL grant to utilize part of the assigned UL radio resources in sending certain data, e.g., data transmitted on signaling radio bearer (SRB), with higher reliability transmission scheme than the reliability provided by the transmission scheme configured by the UL grant. The UE 104 and the BS 108 may utilize the UL grant adjustment for UL data reliability differentiation.

With reference to the adjustments for data reliability differentiation 210, the UE 104 may have UL data without adjustment 212 that includes two different data types, e.g., Data 1 and Data 2. In one example, Data 1 and Data 2 may be associated with different reliability targets. For example, Data 1 may have an ultra-reliability target, e.g., reliability desired for an SRB, and Data 2 may have a normal reliability target, e.g., reliability desired for a data radio bearer (DRB). Without UL grant adjustment, the bits of Data 1 and Data 2 may be filled in one transport block 214. The UL grant may define the transmission scheme parameters, such as MCS and the number of antenna ports, and may implicitly determine the transport block size. If the UE 104 were to transmit the UL data without adjustment 212, it may transmit all the bits in the transport block 214 with the same reliability associated with the transmission scheme. In one example, the reliability level of the transmission scheme related to the UL grant may be the least allowed BLER.

In particular, the UE 104 may divide the UL data without adjustment 212 into two UL data with adjustments, e.g., UL data with adjustment 216 representing Data 1 and UL data with adjustment 218 representing Data 2. A first transport block 220 may carry Data 1, and a second transport block 222 may carry Data 2. The UE 104 may transmit transport block 220 with a very reliable transmission scheme. The UE 104 may transmit transport block 222 with a normal reliability transmission scheme, e.g., with what was indicated in the UL grant.

To provide the adjustments for padding avoidance, the UE 104 may modify the transmission scheme to send UL data with higher reliability in order to reduce or eliminate the zero padding. As discussed above, when the pending UL data without adjustment 242 is not sufficient to fill the transport block, the unfilled bits in the transport block may be filled with padding bits, which may be all zero bits. If the UE 104 were to transmit the UL data without adjustment 242, it would transmit the UL data and padding using the assigned UL radio resources 244. The adjustments for padding avoidance 240 may reduce or eliminate padding bits that are sent with the data. In one example, when the size of padding is larger than a predefined value or threshold, the UE 104 triggers the adjustment of the UL grant to better utilize radio resources and avoid sending some or all of the padding bits. In one example, the UE 104 uses the entire assigned UL radio resources 248 by sending the UL data with adjustment 246, e.g., non-padding UL data, with more reliability. In one example, the UE 104 increases reliability using a more reliable transmission scheme. This may include using a more reliable MCS, transmitting the same data multiple times with different redundancy versions, etc.

The number of zero padding bits of the transport block may be a condition for performing UL grant adjustment. The condition is fulfilled when the number of zero padding bits of the transport block (corresponding to the UL data without adjustment 242) is larger than a predetermined threshold. In one example, the predetermined threshold value is dynamic and configurable by the BS 108.

In some embodiments, UL grant adjustments may be performed for both data reliability differentiation and padding avoidance.

Figure 3:
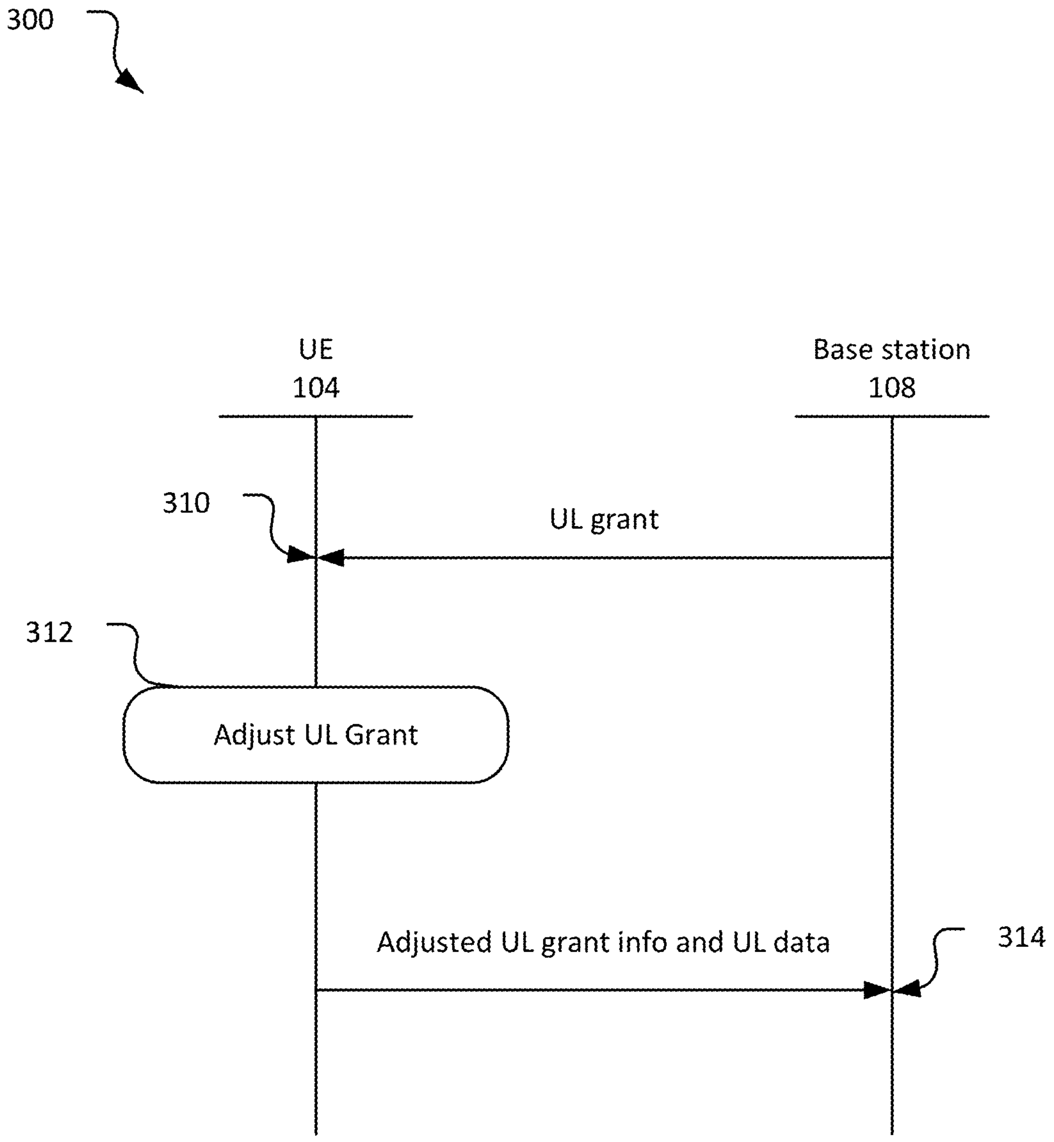
FIG. 3 illustrates a signaling diagram in accordance with some embodiments.

FIG. 3 illustrates a signaling diagram 300 in accordance with some embodiments. The signaling diagram 300 is an example of signaling for UE autonomous UL grant adjustment. In a UE-autonomous, UL-grant-adjustment procedure, the UE 104 may autonomously perform adjustments to the UL grant and communicate the changes back to the network, e.g., the BS 108.

At 310, the UE 104 receives an indication of a UL grant from the BS 108. In one example, the BS 108 sends DCI in a message to transmit the indication of the UL grant. The DCI may be, for example, DCI format 0 or DCI format 4.

In one example, the message carrying the indication of the UL grant, e.g., the DCI, includes an autonomous UL grant adjustment field. The value of the autonomous UL grant adjustment field enables or disables the UE 104 to perform the autonomous UL grant adjustment. For example, an autonomous UL grant adjustment field with a value of '1' or 'True' allows the UE 104 to perform autonomous UL grant adjustment, and an autonomous UL grant adjustment field with a value of '0' or 'False' prohibits or disables the UE 104 from performing the autonomous UL grant adjustment.

The UL grant adjustment indication in the UL grant message may be a condition for performing UL grant adjustment. The condition is fulfilled when the UL grant message enables the UE 104 to perform autonomous UL grant adjustment.

In some embodiments, the network may use a network configuration to indicate whether the autonomous UL grant adjustment feature is enabled. The network configuration may be communicated to the UE 104 using an RRC configuration or MAC control element. The methods for UL grant adjustment (and whether the adjustment is enabled) may be dynamically configured by the network, defined by 3GPP TSs, or both.

The UE 104 configuration may be a condition for performing UL grant adjustment. The condition is fulfilled when the BS 108 configures the UE 104 and enables the UE 104 to perform autonomous or network-assisted UL grant adjustment.

In the event the autonomous UL grant adjustment is enabled, the UE may, at 312, perform the autonomous UL grant adjustment to modify the UL grant. The UE 104 may perform an adjustment for data reliability differentiation (for example, adjustments for data reliability differentiation 210 in FIG. 2) or for padding avoidance (for example, adjustments for padding avoidance 240 in FIG. 2). The UL grant adjustment may be based on one or a combination of network configuration and 3GPP requirements.

In one example, the UE 104 performs autonomous UL grant adjustment when one or more conditions for UL grant adjustment are fulfilled. For example, the UE 104 may perform the autonomous UL grant adjustment when a number of predetermined conditions for UL grant adjustment are fulfilled. Examples of these predetermined conditions are described elsewhere herein.

At 314, the UE 104 sends the adjusted UL grant information and the UL data to the BS 108. In one example, the UE 104 transmits the UL grant adjustment information and the UL data together in one packet. In one example, the UE 104 transmits the UL grant adjustment information and the UL data using separate or different resources.

Figure 4:
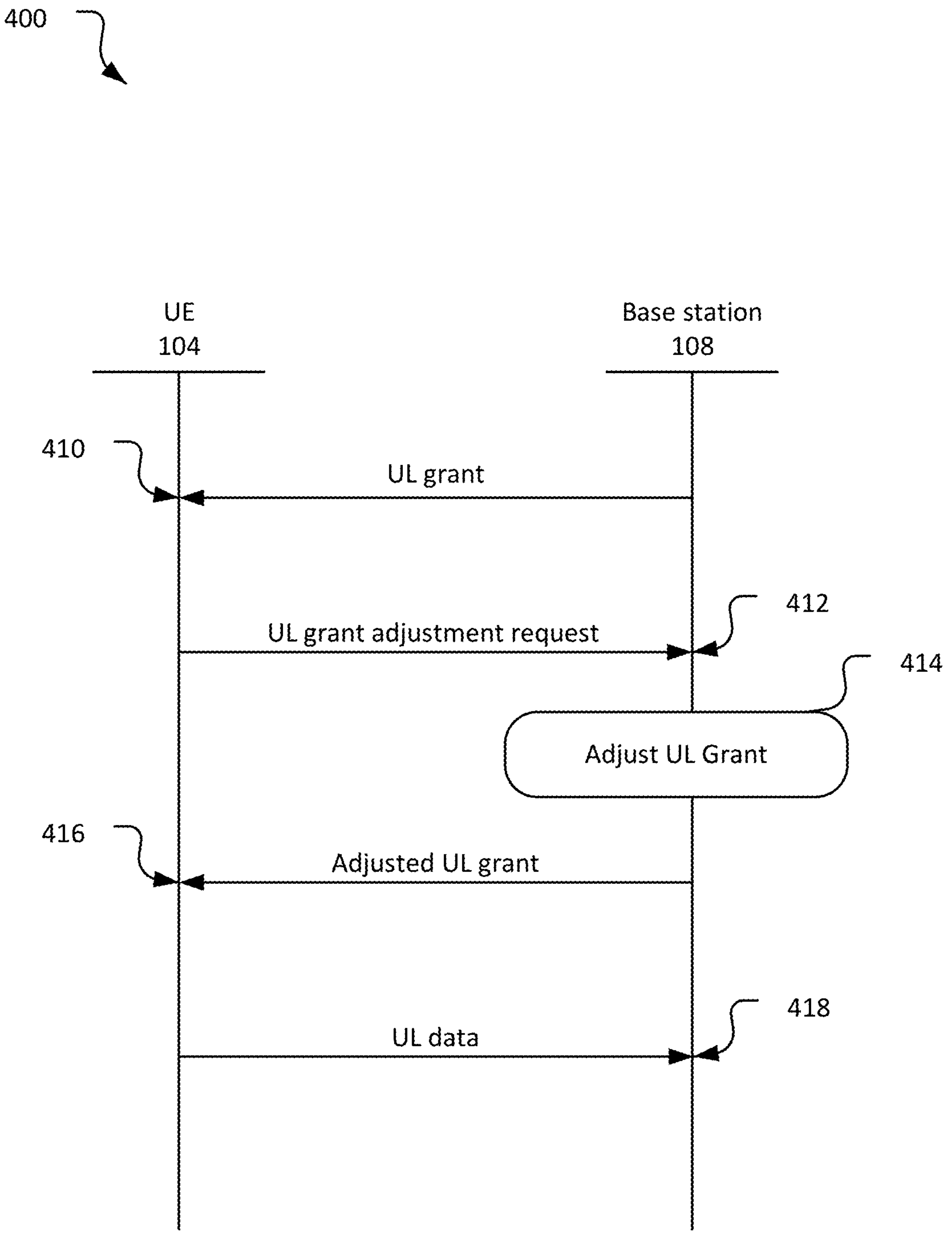
FIG. 4 illustrates a signaling diagram in accordance with some embodiments.

FIG. 4 illustrates a signaling diagram 400 in accordance with some embodiments. Signaling diagram 400 is an example of signaling for network-assisted UL grant adjustment. In network-assisted UL grant adjustment, the UE 104 indicates to the network, e.g., the BS 108, that a UL grant adjustment is needed. In response, the network, e.g., the BS 108, adjusts the UL grant and communicates the adjusted UL grant back to the UE 104.

At 410, the UE 104 receives an indication of a UL grant from the BS 108. In one example, the indication of the UL grant is in a message carrying DCI, e.g., DCI format 0 or DCI format 4.

In one example, the message carrying the indication of the UL grant, e.g., the DCI, includes a network-assisted UL-grant-adjustment field. The value of the network-assisted UL-grant-adjustment field enables or disables the UE 104 to send a request to the BS 108 to adjust the UL grant. For example, a network-assisted UL-grant-adjustment field with a value of '1' or 'True' allows the UE 104 to request the network to adjust the UL grant. A network-assisted UL-grant-adjustment field with a value of '0' or 'False' prohibits or disables the UE 104 from requesting the network to adjust the UL grant.

In some embodiments, the network may use a network configuration to indicate whether the network-assisted UL-grant-adjustment feature is enabled. The network configuration may be communicated to the UE 104 using an RRC configuration or MAC control element. The methods for UL grant adjustment (and whether UL grant adjustment is enabled) may be dynamically configured by the network, defined by 3GPP TSs, or both.

At 412, the BS 108 receives a packet including a UL-grant-adjustment request from the UE 104. In one example, the UE 104 requests the BS 108 to perform adjustments for data reliability differentiation (for example, adjustments for data reliability differentiation 210 in FIG. 2). In one example, the UE 104 requests the BS 108 to perform adjustments for padding avoidance (for example, adjustments for padding avoidance 240 in FIG. 2). In one example, the message carrying UL grant adjustment includes the UE's request to the BS 108 to modify the UL grant, e.g., UL resources, the transmission scheme, or both. In some instances, the UL grant adjustment request 412 may indicate the extra UL grant size (e.g., an indication of an amount of excess resources associated with the UL grant).

In one example, the UE 104 may send the network-assisted UL-grant-adjustment request to the BS 108 when one or more conditions for the UL grant adjustment are fulfilled. In one example, the UE 104 sends the request to the BS 108 to perform the network-assisted UL grant adjustment when one or more predetermined conditions for UL grant adjustment are fulfilled.

At 414, the BS 108 adjusts the UL grant. In one example, the BS 108 adjusts the UL grant based on the UL grant adjustment request received at 412 from the UE 104. The BS 108 may perform the adjustments for data reliability differentiation (for example, adjustments for data reliability differentiation 210 in FIG. 2) or for padding avoidance (for example, adjustments for padding avoidance 240 in FIG. 2). At 416, the UE 104 receives an indication of the adjusted UL grant from the BS 108. In one example, the BS 108 may send the indication in DCI. The adjusted UL grant may include one or more time and frequency resources or transmission schemes that are different from that included in the original UL grant transmitted at 410. At 418, the UE 104 sends the UL data to the BS 108 using the adjusted UL grant indicated at 416.

Figure 5:
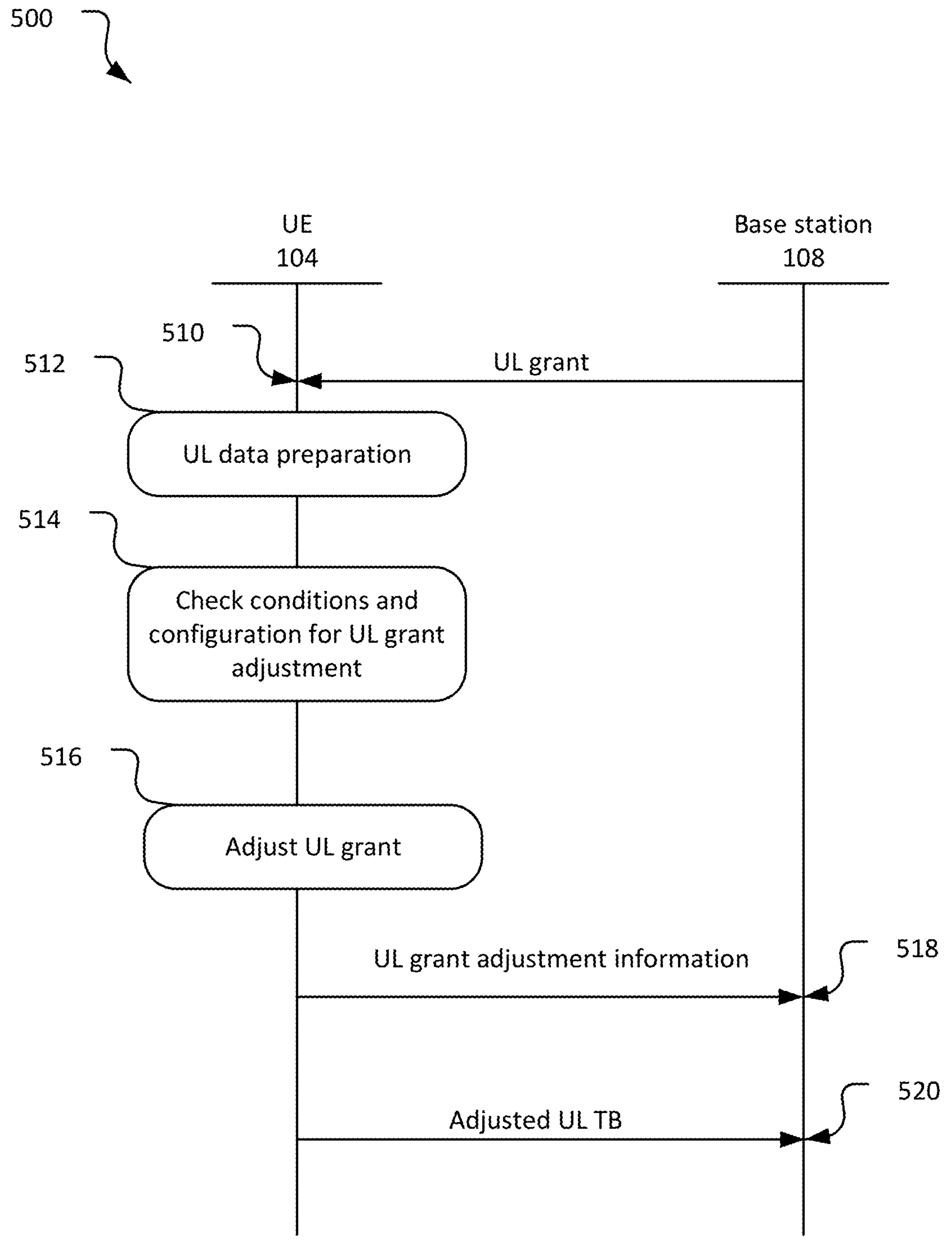
FIG. 5 illustrates a signaling diagram in accordance with some embodiments.

FIG. 5 illustrates a signaling diagram 500 in accordance with some embodiments. The signaling diagram 500 is an example of the signaling between the BS 108 and the UE 104 when the UE performs an autonomous UL grant adjustment. When the UE 104 receives a UL grant, and the UL grant adjustment conditions are fulfilled (e.g., UL grant size was more than available UL data in the UE 104 by a certain predetermined threshold configured by the network) and autonomous UL grant adjustment is allowed (e.g., as per information in UL grant assignment), the UE 104 may autonomously adjust the UL grant and provide an indication of the adjustment (e.g., UL grant adjustment information) to the network. The UL grant adjustment information may include information indicating whether the UL grant was adjusted and, if so, details about the adjustment with respect to one or more data sets. The UL grant adjustment information is described in more detail with respect to FIG. 7 and elsewhere herein.

At 510, the UE 104 receives an indication of a UL grant from the BS 108. In one example, the indication of the UL grant may also indicate that UE autonomous UL grant adjustment is allowed.

At 512, the UE 104 may prepare the UL data to be transmitted. The UE 104 decides whether a UL grant adjustment is needed based on the UL data to be transmitted prepared at 512 and the amount of resources associated with the UL grant signaled at 510.

At 514, the UE 104 checks whether one or more predetermined conditions for UL grant adjustment are fulfilled and whether autonomous UL grant adjustment is allowed by the network. If the conditions are fulfilled and the autonomous UL grant adjustment is allowed, the UE 104 may perform the UL grant adjustment. The one or more predetermined conditions may include a first size of the UL resources allocated for transmission of the UL data exceeding, by a predetermined threshold, a second size of UL resources needed for transmission of the UL data to be transmitted prepared at 512.

Upon determining that one or more predetermined conditions were fulfilled and the autonomous UL grant adjustment is allowed by the network, the UE 104 may, at 516, adjust the UL grant. Adjustment of the UL grant may include but is not limited to, adjusting the time and frequency resources or modifying the transmission scheme. In one example, the UE 104 prepares an adjusted UL transport block to include the UL data to be transmitted based on the adjusted UL grant.

The UE 104 may generate UL grant adjustment information to indicate that the UL grant has been adjusted and to provide further information on how the UL grant was adjusted (e.g., different time/frequency resources, different transmission schemes, etc.). The UE 104 may send the UL grant adjustment information to the BS 108 at 518. The transmission of the UL grant adjustment information may be sent with a high-reliability transmission scheme (e.g., similar to a control channel MCS).

The UE 104 may also send the adjusted UL transport block to the BS 108 at 520. The BS 108 may use the UL grant adjustment information to process the adjusted UL transport block.

In this embodiment, the UL grant adjustment information may be transmitted via dedicated UL radio resources. The UL radio resources dedicated to the UL grant adjustment information may be indicated to the UE 104 using one or more of the following options. In the first option, pre-aligned resources (e.g., the first few physical resource blocks (PRBs) in the assigned UL radio resources per UL Data set) may be defined in a 3GPP TS or provided via a network configuration. In a second option, the network may use the message providing the indication of the UL grant at 510 to indicate the UL radio resources that are to be used by the UE 104 for the UL grant adjustment information. In a third option, the additional radio resources are assigned by a downlink control information (DCI) or are defined by 3GPP TSs requirements.

In one example, the UE 104 prepares two packets (transport block or MAC packet data unit, PDU) at 516: a first packet to carry the UL grant adjustment information and a second packet to convey the UL data. In one example, the message with the initial UL grant received at 510 provides UL resources for transmitting the first and the second packets. In one example, the network, e.g., the BS 108, configures the transmission schemes of the first packet. In one example, the initial message received at 510 includes the transmission schemes for the first or the second packet.

In one example, the first packet includes UL grant adjustment information to indicate the adjustment to the UL grant has been applied. The UE 104 may transmit the UL grant adjustment information using dedicated UL resources that are predefined by the 3GPP TS or by the base station 108 via downlink control information or the UL grant message. The UE 104 further generates an adjusted UL transport block (TB) with the UL data based on the adjustment to the UL grant and transmits the adjusted UL TB in the second packet using dedicated UL resources that are predefined or assigned in downlink control information in the initial UL grant message.

In one example, the second packet includes UL data. The UE 104 may send UL data in the first packet using resources and transmission schemes associated with UL grant adjustment. In one example, the UE 104 transmits the second packet using UL resources different from the UL resources allocated for the transmission of the first packet. At 520, the BS 108 receives the second packet that provides the adjusted UL transport blocks. The adjusted transport block includes all the transport blocks associated with the UL data. The BS 108 uses information in the first packet to receive and decode UL data in the second packet at 520.

Figure 6:
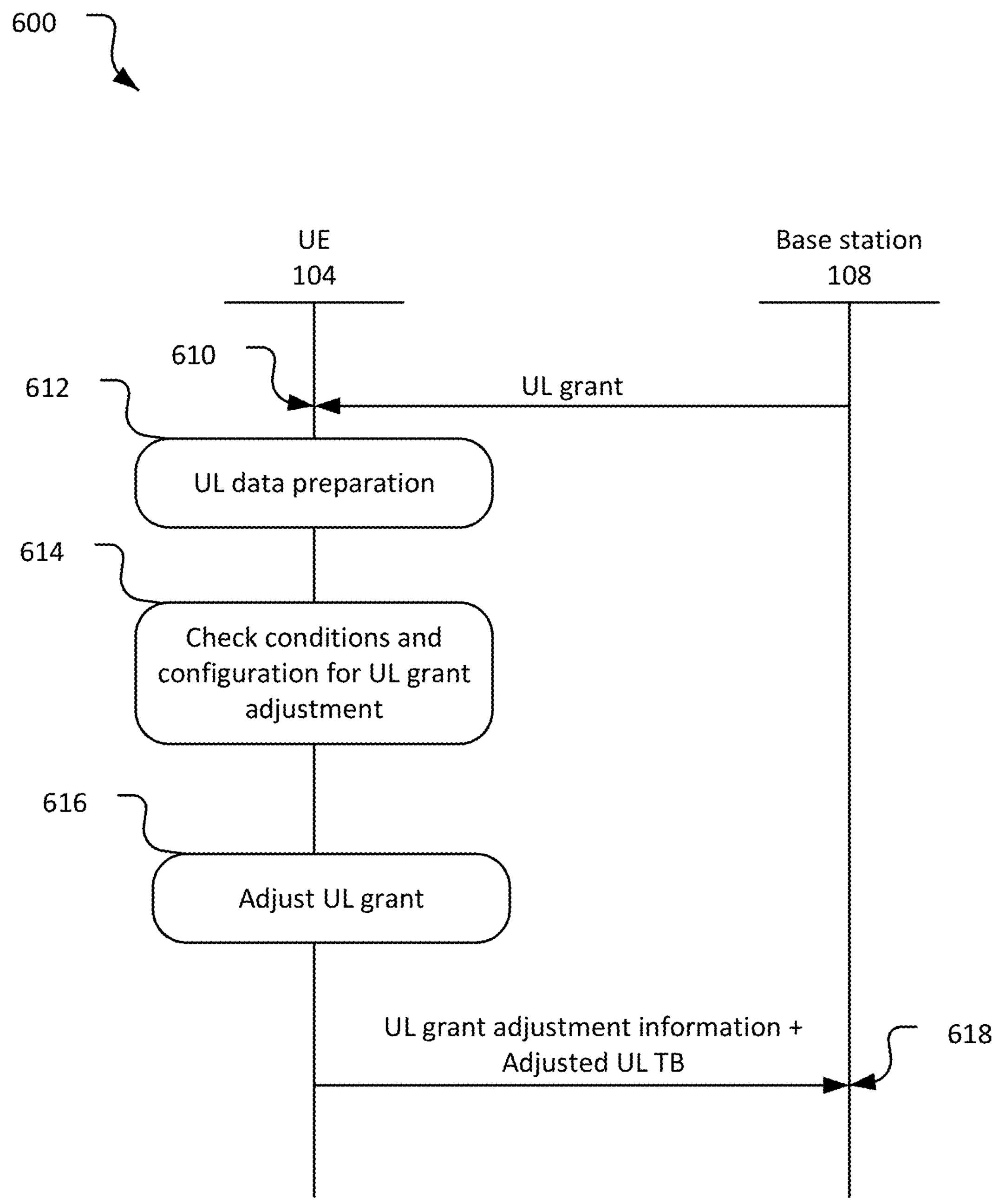
FIG. 6 illustrates a signaling diagram in accordance with some embodiments.

FIG. 6 illustrates a signaling diagram 600 in accordance with some embodiments. Signaling diagram 600 is an example of the signaling between the BS 108 and the UE 104 performing autonomous UL grant adjustment, in which the UE 104 uses the same resources for sending UL data and UL grant adjustment information.

At 610, the UE 104 receives a message from the BS 108 that indicates a UL grant. Based on the transmission scheme and allocated UL resources, the UE 104 determines whether an adjustment to UL resources or the transmission scheme is needed. In one example, the message indicates that UE autonomous UL grant adjustment is allowed. In one example, the network configures the UE 104 to use one transmission for sending UL data and UL grant adjustment information. In one example, the message at 610 configures the UE 104 to use a set of UL resources to transmit UL data and UL grant adjustment information. In one example, the message at 610 determines the resources for transmitting UL data and UL grant adjustment information.

At 612, the UE 104 prepares the UL data to be transmitted. The UE 104 decides whether UL grant adjustment is desired based on the UL data to be transmitted prepared at 612.

At 614, the UE 104 checks whether one or more conditions and configurations for UL grant adjustment are fulfilled and allowed by the network. In one example, the UE 104 performs UL grant adjustment only when the conditions for UL grant adjustment are fulfilled. In one example, one or more conditions include a first size of the UL resources allocated for transmission of the UL data exceeding, by a predetermined threshold, a second size of UL resources needed for transmission of the UL data using a transmission scheme associated with the UL grant. In one example, the UE 104 considers the joint transmission of UL data and UL grant adjustment using the same UL resources in determining whether the UL grant adjustment conditions are fulfilled.

At 616, the UE 104 adjusts the UL grant, including but not limited to adjusting the time and frequency resources or modifying the transmission scheme. In one example, the UE 104 prepares a modified UL data to be transmitted and adjusts the UL grant based on the modified UL data to be transmitted. The modified UL data to be transmitted (may also be referred to as adjusted TB) includes the UL data and UL grant adjustment information.

The UE 104 may multiplex the UL grant adjustment information with the adjusted TB, which may then be transmitted to the BS 108 at 618. The UL grant adjustment information indicates to the BS 108 whether the UE 104 has performed autonomous UL grant adjustment. Based on the information carried by the UL grant adjustment information, the BS 108 decodes the adjusted UL TB to obtain the UL data.

At 618, the UE 104 uses the same radio resources for transmission of the UL grant adjustment information and the UL data. In some instances, the location of UL adjustment information in the assigned radio resources may be defined by 3GPP TSs. For example, the first physical resource block (PRB) indicates whether the UE 104 has adjusted the UL grant, and the following 3 PRBs indicate information about the first UL data set followed by the first UL data set, then the next 3 PRBs for information about the second UL data set followed by the second UL data set, so on.

Figure 7:
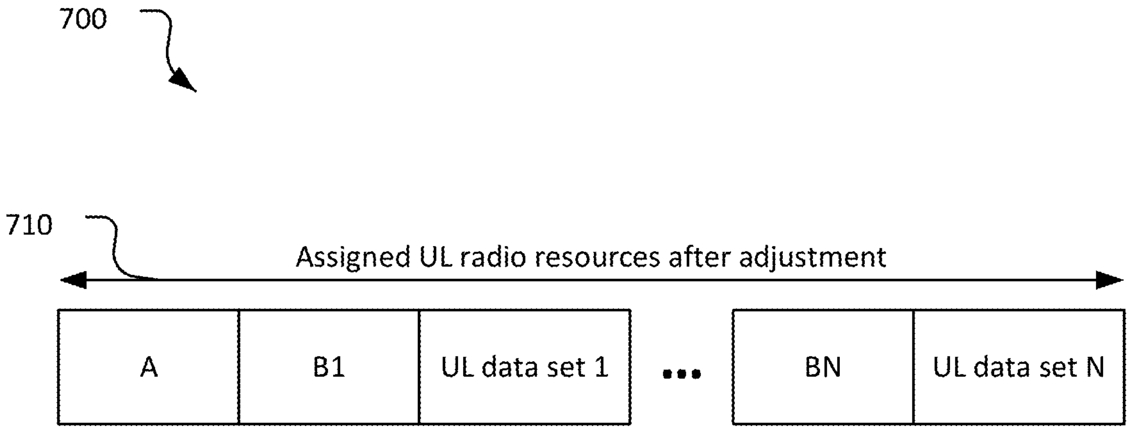
FIG. 7 illustrates an assigned uplink radio resource after adjustment in accordance with some embodiments.

FIG. 7 illustrates an assigned uplink radio resource 700 after adjustment in accordance with some embodiments. Assigned uplink radio resources 700 is an example of a data structure of UL grant adjustment information and UL data sets in assigned UL radio resources after adjustment 710. The UL data is divided into N data sets, UL data set 1 to UL data set N. The UE 104 may divide the UL data into the N data sets based on the requirements/targets of the data sets (e.g., QoS requirements, priorities, or reliability targets). The UE 104 may allocate a separate TB to each data set, e.g., allocate TB 1 to UL data set 1, TB 2 to UL data set 2, and TB N to UL data set N. The UE 104 may transmit each TB with its own transmission scheme, e.g., MCS, e.g., TB 1 with MCS 1, TB 2 with MCS 2, and TB N with MCS N. The UL grant adjustment information may include information A and additional N information, e.g., B1 to BN, respectively, corresponding to the N data sets. In one example, A indicates whether the UL grant is adjusted. For example, the A field may include a one-bit value in which a '1' or 'True' value indicates that the UE has adjusted the UL grant, and a '0' or 'False' value indicates that the UE has not adjusted the UL grant. The information Bk provides the specific adjustment, e.g., adjustment to UL resources or the transmission scheme, applied to a data set k, for k is a number between 1 and N. In one example, the UL data is divided into more than one set when each set has a different requirement, e.g., different MCS.

For example, the UL grant adjustment information at 518 in FIG. 5 may include A and B1 to BN. The BS 108 retrieves the value of the A field and B1-BN fields from the UL grant adjustment information and uses the information to decode the UL TBs received at 520.

In another example, the UL grant adjustment information and UL data at 618 in FIG. 6 may have a similar structure as assigned UL radio resources 700.

Figure 8:
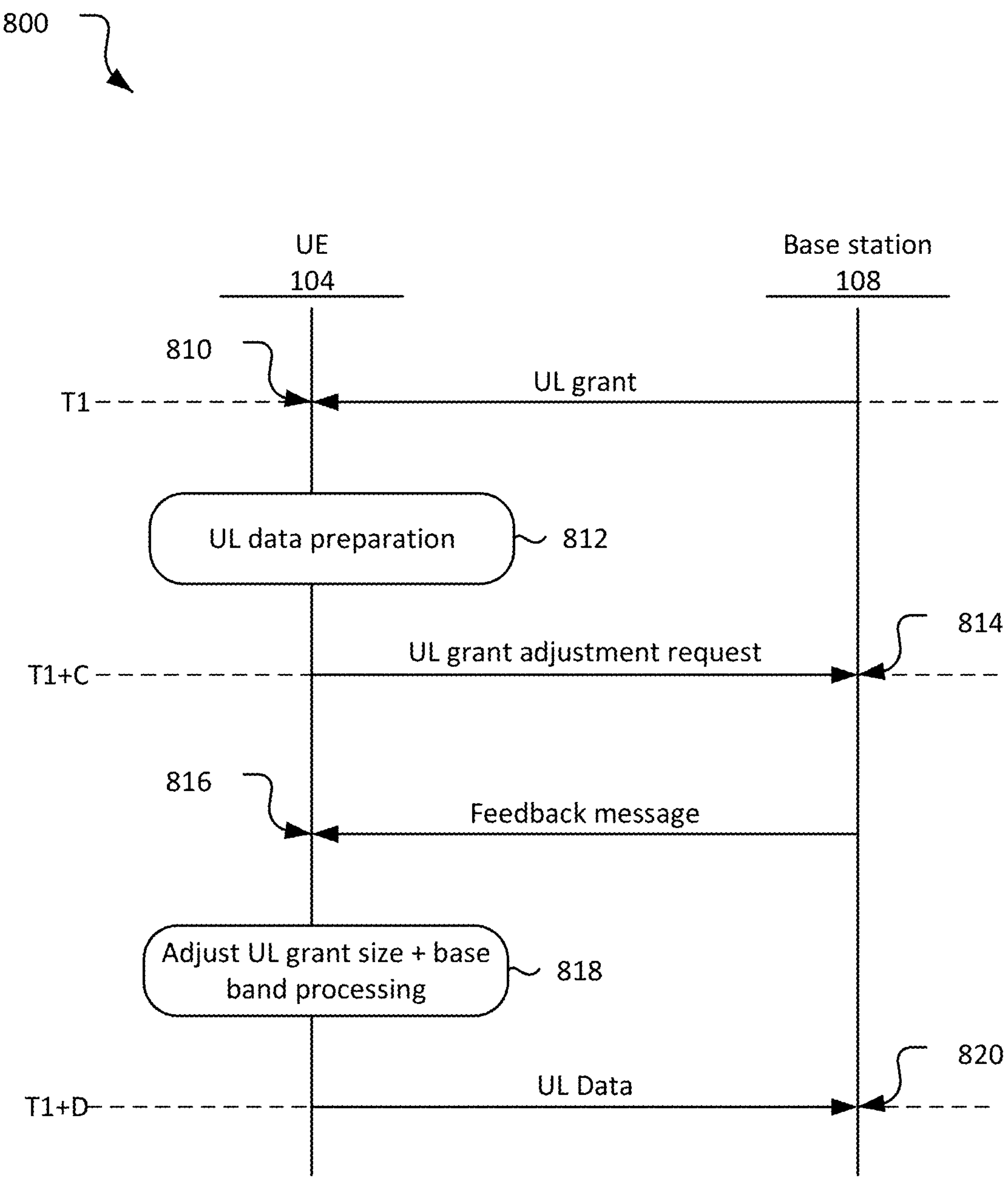
FIG. 8 illustrates a signaling diagram in accordance with some embodiments.

FIG. 8 illustrates a signaling diagram 800 in accordance with some embodiments. The signaling diagram 800 is an example of the signaling between the BS 108 and the UE 104 while performing a network-assisted UL grant adjustment.

At 810, the UE 104 receives a grant message with an indication of the UL grant at time T1. In one example, the grant message schedules UL resources at time T1+D for UL transmission of UL data. The network, e.g., the BS 108, sets the value D to allow time for the UE 104 to request a UL grant change, receive a response from the BS 108 with the adjusted UL grant, and prepare the UL packet based on the adjusted UL grant.

At 812, the UE 104 prepares the UL MAC PDU. The UE 104 decides whether UL grant adjustment is needed based on the UL MAC PDU prepared at 812. In one example, based on the prepared UL MAC PDU, the UE 104 determines that the UL data cannot fill all the UL resources allocated by the grant message (e.g., the UL grant includes extra UL resources).

At time T1+C, the UE 104 sends the UL grant adjustment request to the BS 108. The BS 108 receives the UL grant adjustment request at 814. The resources for the transmission of the UL grant adjustment request may be assigned by the UL grant received at 810 or in another manner. For example, in some embodiments, the UL grant adjustment request may be sent using signals similar to signals used for the transmission of acknowledgment and negative acknowledgment (ACK/NACK) on the physical uplink control channel (PUCCH) as described in 3GPP TSs 36.211-36.214 and 38.211-38.214. In some embodiments, the UL grant adjustment request may be sent using signals in a shared common space for different UEs, e.g., a contention space like a random access (RA) preamble.

The UL grant adjustment request may indicate unneeded UL resources. For example, the UL grant adjustment request may indicate the extra UL grant size. The UL grant adjustment request may include a specific number of extra bytes in the UL grant or a size range that encompasses the number of extra bytes in the UL grant. In one example, the UL grant adjustment request includes the size of the UL data that the UE 104 needs to transmit with a reliability greater than a predetermined threshold, e.g., high reliability.

At 816, the UE 104 receives a feedback message from the BS 108. In one example, the feedback message includes a UL grant adjustment that the UE 104 is to apply. The UL grant adjustment may remove some or all of the unneeded UL resources. For example, if the UL grant is associated with a first amount of UL resources (based on, for example, a first UL grant size and a first transmission scheme), the UL grant adjustment may provide an adjusted UL grant that is associated with a second amount of UL resources (based on, for example, a second UL grant size or a second transmission scheme). The BS 108 may send the feedback message using signals similar to signals used for transmission of ACK/NACK on the PDCCH as specified in 3GPP TSs 36.211-214 and 38.211-214. Additionally/alternatively, the BS 108 may send the feedback message in DCI on the PDCCH.

At 818, the UE 104 processes the feedback message, adjusts the UL TB, and processes the baseband signal to prepare the UL data for transmission based on the adjusted UL grant.

At 820, the BS 108 receives the UL data. The UE 104 sends the UL data D seconds after receiving the UL grant at time T1 at 810. As mentioned above, the network may set the value D to schedule the transmission of UL data at 820 to provide the UE 104 sufficient time for operations at 812, 814, 816, and 818.

Figure 9:
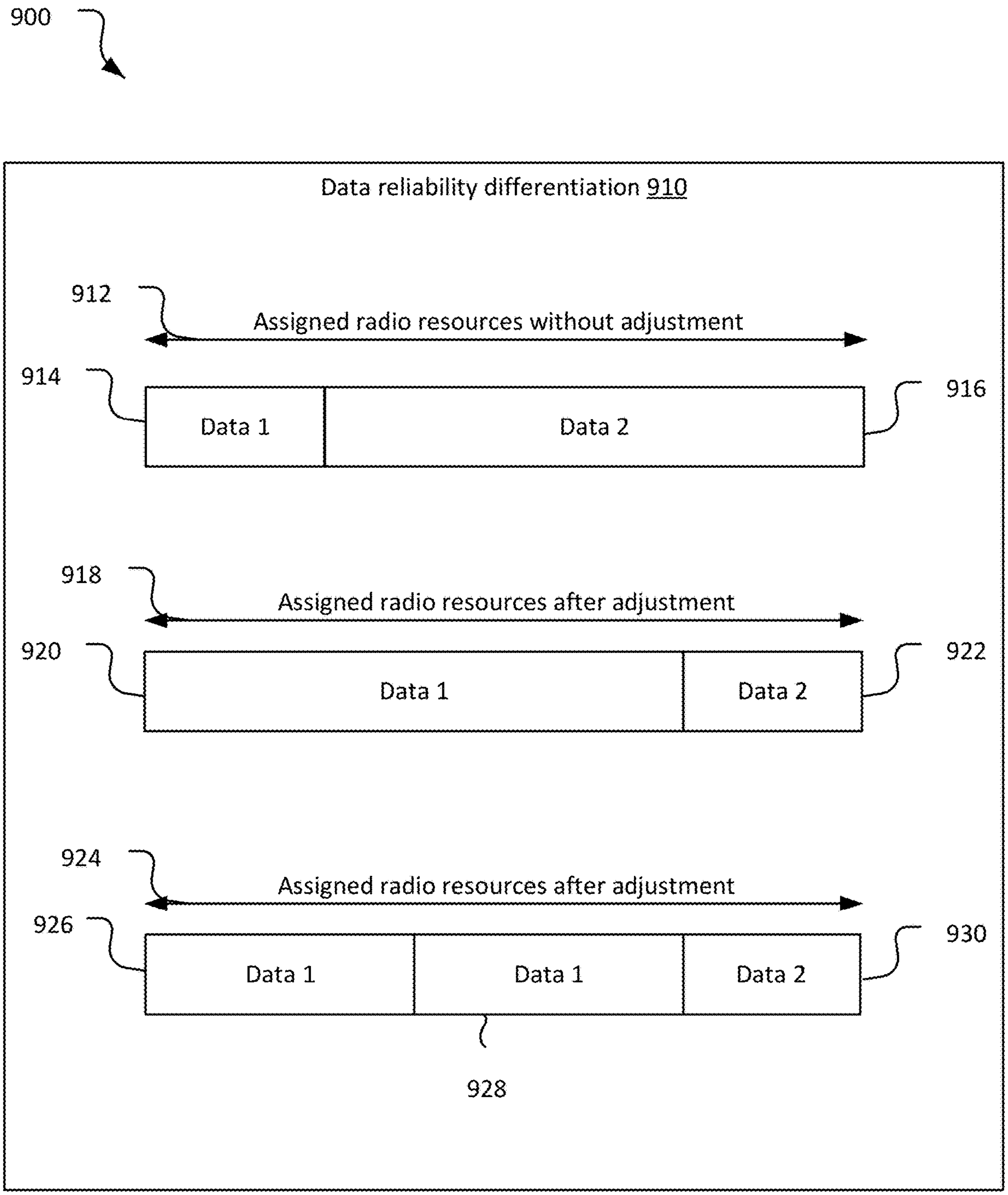
FIG. 9 illustrates an uplink grant adjustment in accordance with some embodiments.

FIG. 9 illustrates an uplink grant adjustment 900 in accordance with some embodiments. The uplink grant adjustment 900 is an example of an uplink grant adjustment used for transmitting important (e.g., critical) data with high reliability. Both data reliability differentiation and padding avoidance use cases of UL grant adjustment can provide high-reliability transmission for important data. The UL grant adjustment 900 is an example of using data reliability differentiation 910 to transmit important data with high reliability. In data reliability differentiation 910, the UE 104 may transmit a first portion of the data, e.g., important data, with high reliability, and a second portion of the data, e.g., normal data, with the same reliability provided by the initial UL grant.

The assigned radio resources without adjustment 912 illustrates an abstract representation of the UL radio resources that the BS 108 assigned to the UE 104 via the UL grant message. Without any adjustment to the assigned radio resources without adjustment 912, the UE 104 would use the resources to transmit two sets of data: Data 1 and Data 2. In one example, Data 1 is the important data that would benefit from a high-reliability transmission, and Data 2 is normal data that can be transmitted with relatively lower reliability than the important data. In another example, Data 1 is associated with a first priority, and Data 2 is associated with a second priority where the first priority is greater than the second priority (higher priority requires more reliability). The differences in desired reliability for Data 1 and 2 may be the result of, for example, Data 1 and Data 2 having different QoS requirements. For example, Data 1 may have a more stringent QoS requirement than Data 2.

The size of the box corresponding to radio resources 914 is an abstract representation of the amount of resources allocated for the transmission of Data 1, and the size of the box corresponding to radio resources 916 is an abstract representation of the amount of resources allocated for the transmission of Data 2. As shown, the radio resources 914 originally allocated for the transmission of the important data is less than the radio resources 916 originally allocated for the transmission of normal data; however, this may be different in other instances.

Assigned radio resources after adjustment 918 illustrate an abstract representation of the UL radio resources after UL grant adjustment. In one example, the size of radio resources allocated to UL transmission does not change with UL grant adjustment; however, the assigned radio resources after adjustment 918 may have a different apportionment between important data (e.g., Data 1) and normal data (e.g., Data 2).

The size of the box corresponding to radio resources 920 may be an abstract representation of the amount of resources allocated for the transmission of Data 1 after adjustment. The radio resources 920 is larger than the radio resources 914 to illustrate that the UL grant adjustment increases the radio resources allocated to transmitting the important data, Data 1. The UE 104 may use the adjusted assigned radio resources to transmit the important data with radio resources 920 with a higher-reliability transmission scheme that is associated with radio resources 914.

In one example, the size of the box corresponding to radio resources 922 is an abstract representation of the amount of resources allocated for the transmission of Data 2 after adjustment. The radio resources 922 is smaller than the radio resources 916 to illustrate that the UL grant adjustment decreases the radio resources allocated to transmitting non-critical data, Data 2.

Assigned radio resources after adjustment 924 illustrate an abstract representation of the UL radio resources after UL grant adjustment. In one example, UE uses the adjusted assigned radio resources to send two or more packets containing important data to achieve high reliability through repetition. The radio resources 926 and 928 represent radio resources allocated to two distinct packets containing Data 1. In one example, the packet transmitted using the radio resources 926 has a different redundancy version than the packet transmitted using the radio resources 928. The radio resources 930 represents the adjusted resources allocated to transmitting normal data, Data 2.

In one example, the size of the boxes corresponding to radio resources 926 and 928 are abstract representations of the amount of resources allocated for the transmission of Data 1 after adjustment. The radio resources 926 and 928 combined are larger than the radio resources 930 to illustrate that the UL grant adjustment increases the radio resources allocated to transmitting critical data, Data 1, compared to resources allocated to transmitting non-critical data, Data 2.

In one example, the sum of resources allocated to the transmission of Data 1 and Data 2 without adjustment is the same as the sum of resources allocated to Data 1 and Data 2 after adjustment.

Figure 10:
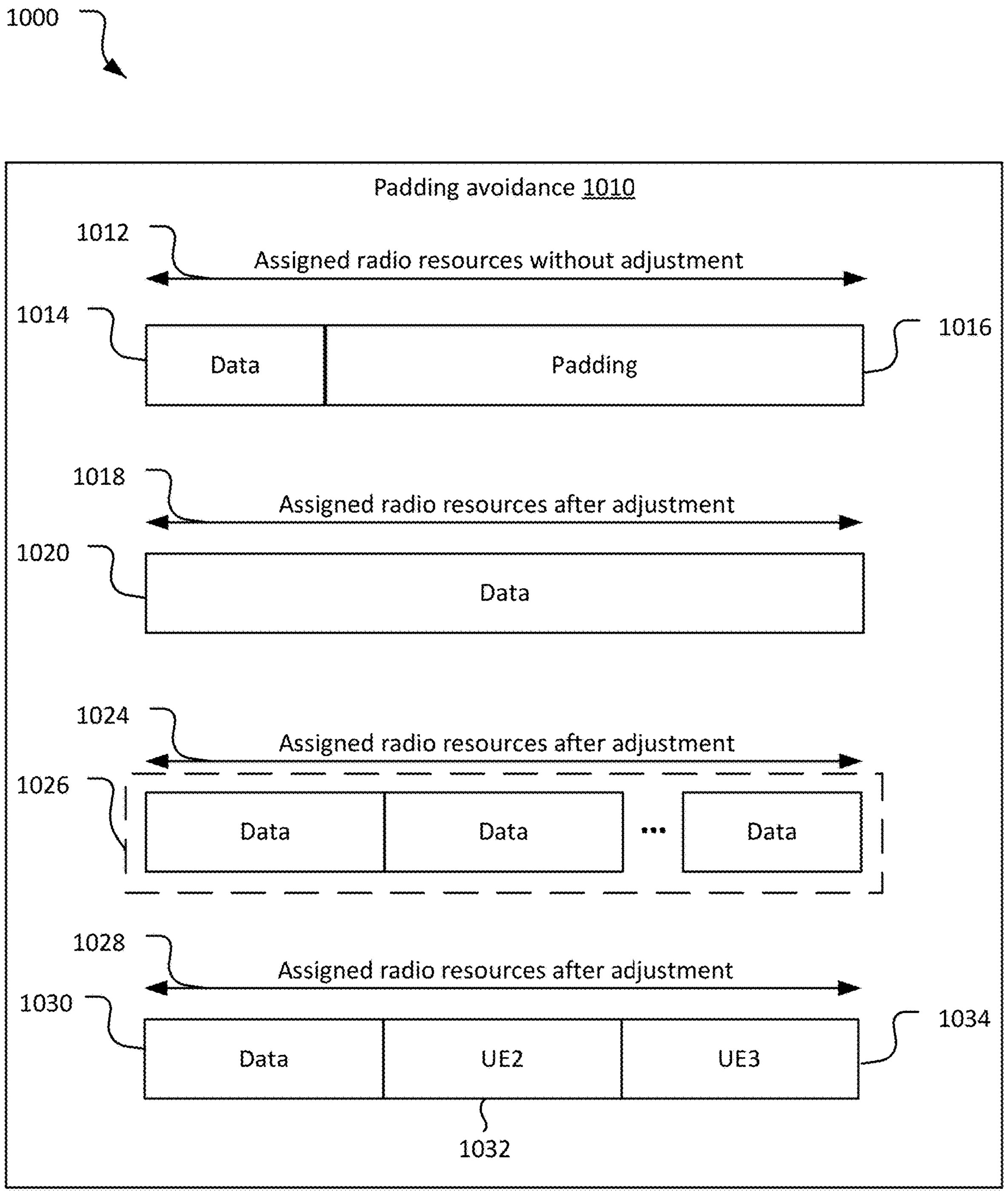
FIG. 10 illustrates an uplink grant adjustment in accordance with some embodiments.

FIG. 10 illustrates an uplink grant adjustment 1000 in accordance with some embodiments. UL grant adjustment 1000 is an example of using padding avoidance 1010 to transmit important data with high reliability. In padding avoidance 1010, the UL resources previously used by padding are adjusted to be used by non-padding data to improve the reliability of the transmission of non-padding data. In one example, padding avoidance 1010 reduces the BLER, e.g., the probability that a TB is not received correctly at the receiver for non-padding data. Smaller BLER reduces retransmission, which would reduce the UL data transfer latency and save UE power of UL data re-transmissions.

Assigned radio resources without adjustment 1012 illustrate an abstract representation of the UL radio resources that the base station, e.g., the BS 108 in FIG. 1, assigned to UE via the UL grant message. In one example, the UE, e.g., the UE 104 in FIG. 1, uses the assigned UL resources to transmit the TB, including data and padding. Data 1014 abstractly represents the UL radio resources used to transmit the UL data. Padding 1016 abstractly represents the UL radio resources used to transmit the padding, e.g., zero padding.

In one example, the size of the assigned radio resources after adjustment 1018 remains the same as assigned radio resources without adjustment 1012. UL resources 1020 abstractly represent the UL radio resources used to transmit the UL data after adjustment. In one example, the UE reduces the transport block size by reducing the number of padding bits and uses a more reliable transmission scheme to fill the UL resources 1020. In one example, a more reliable transmission scheme uses a lower modulation order. In one example, a more reliable transmission scheme uses a lower channel coding rate, e.g., more parity bits for the same data bits. In one example, the UL grant adjustment causes the UE to adjust the TB size to be equal to the non-padding data size.

In one example, the size of the assigned radio resources after adjustment 1024 remains the same as assigned resources 1012 without adjustment. In one example, the size of the assigned radio resources after adjustment 1024 differs from the size of assigned resources 1012 without adjustment (not shown in FIG. 10). Data packets collectively represented by packet 1026 abstractly represent the UL radio resources used to transmit the UL data after adjustment. In one example, the UE transmits the data multiple times to increase its reliability. In one example, each transmission uses a different redundancy version. In one example, the UE encodes the MAC PDU into multiple packets. The base station receives all the packets and uses them to retrieve the UL data.

In one example, the UL grant is associated with a first transmission scheme to generate a transmission for the UL resources, having a first non-padding portion and a first padding portion. The adjustment to the UL grant provides an adjusted UL grant with a second transmission scheme to generate a transmission for the UL resources, having a second non-padding portion greater than the first non-padding portion. In one example, the first transmission scheme includes the first parameters associated with the first reliability of the transmission of the UL data, and the second transmission scheme includes second parameters associated with the second reliability of the transmission of the UL data, wherein the second reliability is greater than the first reliability. In one example, the first parameters include a first MCS and the second parameters include a second MCS. In one example, the first parameters are to cause transmission of the UL data with the first number of repetitions, and the second parameters are to cause transmission of the UL data with the second number of repetitions that is greater than the first number of repetitions.

The non-required part of the assigned radio resources may be used for other purposes. For example, in network-assisted UL grant adjustment used for padding avoidance, the UE 104 may adjust its TB to transmit UL data with no or reduced amount of padding. The UE 104 may inform the BS 108 of unused resources, and the BS 108 may allocate the unused part of the assigned resources to another UE. Reducing the TB of the UE 104 saves UE's power and improves the radio resources utilization by assigning the non-required and unused radio resources to other purposes, e.g., allocating to other UEs.

In one example, the base station assigns initial UL resources 1012 to a UE. The UL adjustment modifies the UL resources assigned to the UE based on the pending UL data. For example, the UE reduces its TB size to transmit less or no padding. The network assigns the unused initial UL resources to other UEs. In one example, the assigned resources after adjustment 1028 are divided between multiple UEs. The radio resources 1030 is an abstract representation of the radio resources allocated to the UE to transmit its UL data, Data. The box corresponding to radio resources 1032 is an abstract representation of the portion of UL radio resources in the initial grant that is not used by the UE and that the network assigns to the second UE, e.g., UE2. The box corresponding to radio resources 1034 is an abstract representation of the portion of UL radio resources in the initial grant not used by the UE and network assigned to the third UE, e.g., UE3. In one example, the sum of all radio resources in 1030, 1032, and 1034 is the assigned radio resources after adjustment 1028. In one example, the size of assigned radio resources after adjustment 1028 is the same as that of assigned radio resources without adjustment 1012. In one example, the size of assigned radio resources after adjustment 1028 differs from that of assigned radio resources without adjustment 1012.

In one example, the UE 104 is the first UE. The UL resources include a first part and a second part. The UE sends a message that indicates a request that the adjustment to the UL grant be applied. Based on the UE's request, the base station generates an adjusted UL grant to allocate the first part of the UL resources to the first UE. The base station generates an additional UL grant to allocate the second part of the UL resources to a second UE. The base station sends the first DCI to provide the adjusted UL grant to the first UE and the second DCI to provide the additional UL grant to the second UE.

FIG. 11 illustrates system parameters 1100 in accordance with some embodiments. System parameters 1100 are examples of transmission scheme parameters that may be changed to apply a UL grant adjustment. The change in the UL grant may be communicated by the UE 104 signaling a change in one or more of the system parameters 1100 to the BS 108 or by the BS 108 signaling a change in one or more of the system parameters 1100 to the UE 104. The changes may be signaled through uplink control information (UCI), DCI, RRC signaling, MAC CE signaling, etc.

In one example, the system parameters may include parameters 1110, which may reduce a TB size. The parameters 1110 may include an MCS field and an antenna port field. In one example, a list of system MCSs is provided in a table in 3GPP specifications 36.214 or 38.214, in which each MCS is associated with an MCS index. In one example, an MCS with a smaller MCS index is associated with a small transport block size compared to an MCS with a larger MCS index. In one example, the antenna port field determines the number of layers used for uplink transmission. In one example, a larger number of antenna ports used for transmission is associated with a larger transport block size.

The MCS field may include a bits (e.g., 5 bits) to indicate a new MCS selected by the UE in order to reduce the TB size.

The antenna port(s) field may include b bits (e.g., 4, 5, or 6 bits) to indicate a new antenna port index selected by the UE 104 in order to reduce the number of layers and, therefore, the TB size.

While the definitions of the MCS field and antenna ports field provided above are based on the premise that the UE indicates or requests the UL grant adjustment by providing an indication of the new parameter 1110 to reduce the TB size, in another embodiment, the UE 104 may indicate or request the UL grant adjustment by providing an indication of the new parameter 1110 to increase a TB size. In yet another embodiment, the base station may indicate the UL grant adjustment by providing the UE 104 with an indication of the new parameter 1110 to increase/reduce the TB size.

In some embodiments, the new parameter 1110 may be used to adjust the TB size to adjust a relative apportionment of UL resources to normal and important data as described with respect to assigned radio resources after adjustment 918 of FIG. 9.

In one example, the system parameters 1100 may include parameter 1120 to provide for UL data repetition with a different redundancy version (RV) instead of padding. The parameter 1120 may include a number of new codeblocks with a new data field with c bits (e.g., 8 bits) that indicate the number of codeblocks that contains new data. The UE 104 becomes aware of this number after it has received the UL grant and partially fills it up with data. The BS 108 uses this number in order to determine the number of codeblocks that contain new data but also in order to determine the codeblocks that will correspond to the same data but with a different RV.

The UE 104 may divide a transport block into one or more codeblocks. The parameter 1120 may be associated with transport block size. In one example, the larger the transport block size, the larger the number of codeblocks with new data. In one example, the UE 104 may indicate a UL grant adjustment or request the UL grant to be adjusted based on the number of codeblocks with new data in the parameter 1120. Additionally/alternatively, the BS 108 may indicate a UL grant adjustment by providing an updated parameter 1120 to the UE 104.

In some embodiments, the new parameter 1120 may be used to transmit the important data multiple times to increase its reliability as described with respect to assigned radio resources after adjustment 924 of FIG. 9.

In one example, system parameters 1100 includes parameters 1130 that may be used to adjust (e.g., reduce) time-frequency resources. The parameters 1130 may include a frequency-domain resources assignment (FDRA) field with d bits. The number d may depend on the resource allocation type, which may be the same as the UL grant's resource allocation type. The FDRA field may indicate a number of PRBs occupied by the PUSCH with the UL data. This may be selected by the UE 104 in some instances. The parameters 1130 may additionally/alternatively include a time-domain resource assignment (TDRA) field with e bits. The number e may be up to four bits and may depend on the configured time-domain allocation list. In one example, the TDRA field may reference an index of a configured table that indicates the time-domain resources, which may be selected by the UE 104 in some instances. The parameters 1130 may be associated with the physical resources allocated for the UL transmission.

In some embodiments, the UE 104 may use the new parameter 1130 to indicate the unused radio resources to the BS 108. The BA 108 may allocate the unused radio resources to another UE as described with respect to assigned radio resources after adjustment 1028 of FIG. 10.

In one example, the UE 104 indicates a UL grant adjustment or requests the UL grant to be adjusted based on parameters 1130 to indicate a new FDRA or TDRA. In one example, the base station configures the UE 104 with parameters 1130 to indicate the new FDRA or TDRA to adjust the UL grant.

In one example, the UL grant is associated with a first transmission scheme to be used to transmit the UL data. The adjustment to the UL grant is to provide an adjusted UL grant associated with a second transmission scheme to be used to transmit the UL data, wherein the second transmission scheme includes at least one parameter of the system parameters 1100 that is different from a corresponding parameter of the first transmission scheme.

In one example, at least one parameter is a modulation and coding scheme, a number of antenna ports, or a number of codeblocks with new data.

In one example, the UL resources are the first UL resources having a first frequency-domain resource assignment (FDRA) and a first time-domain resource assignment (TDRA). The adjustment to the UL grant is to provide an adjusted UL grant associated with second UL resources having a second FDRA and a second TDRA, and the first FDRA is different from the second FDRA, or the first TDRA is different from the second TDRA.

Figure 12:
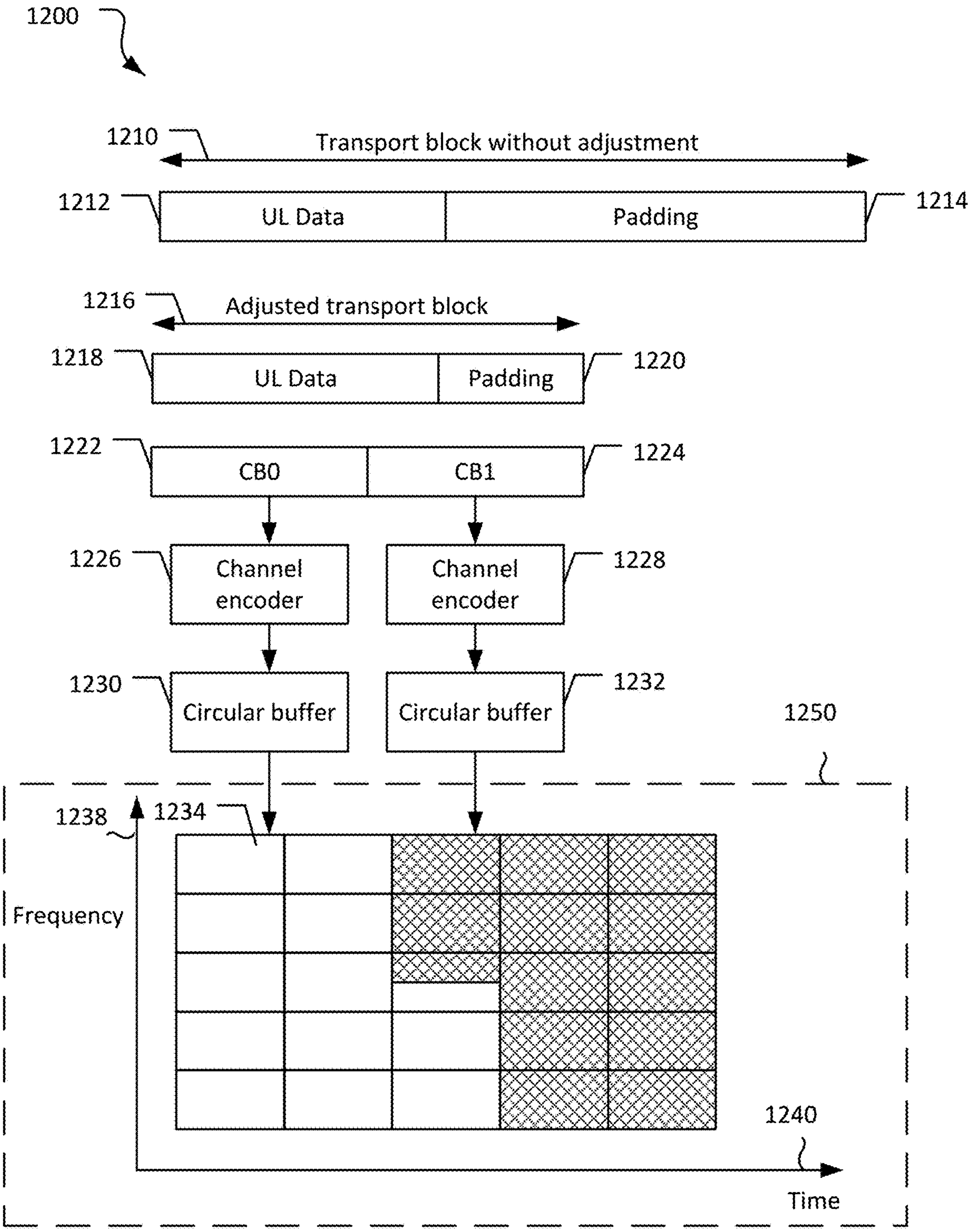
FIG. 12 illustrates an uplink grant adjustment in accordance with some embodiments.

FIG. 12 illustrates an uplink grant adjustment 1200 in accordance with some embodiments. The UL grant adjustment 1200 is an example of using UL grant adjustment to transmit important data with increased reliability.

A transport block without adjustment 1210, which may be based on an original UL grant, may include UL data 1212 and padding 1214. In one example, a codeblock segmentation operation may divide the transport block without adjustment 1210 into one or more codeblocks (CBs). In one example, without UL grant adjustment, a first one or more CBs may be filled with UL data, and a second one or more CBs may be filled with zero padding. Each codeblock may be encoded using a channel encoder. A circular buffer may receive the coded symbols. The redundancy version of the transmission scheme may determine how the resource mapping operation reads the data from the circular buffer and maps them to the resource elements. When the UE 104 uses the original UL grant, the UE 104 would transmit the coded bits of the CBs with UL data as well as the CBs with all-zero codeblock padding.

In one example, the UL grant adjustment 1200 may modify the TB size to more fully utilize the UL resources. Adjusted TB 1216 is an example of a modified TB. Adjusted TB 1216 includes UL data 1218. In one example, adjusted TB 1216 includes padding 1220. In one example, the size of padding 1220 is smaller than the size of padding 1214.

In one example, the codeblock segmentation operation divides the UL data 1218 and padding 1220 into codeblocks, e.g., codeblock 1222, CB0, and codeblock 1224, CB1. Channel encoder 1226 encodes codeblock 1222 based on the MCS associated with the codeblock 1222. Channel encoder 1228 encodes codeblock 1224 based on the MCS associated with codeblock 1224. In one example, codeblocks 1222 and 1224 have the same MCS. In one example, codeblocks 1222 and 1224 have different MCSs.

In one example, circular buffer 1230 receives the coded bits from channel encoder 1226, and circular buffer 1232 receives the coded bits from channel encoder 1228. Resource mapping operation maps the coded bits in circular buffers 1230 and 1232 to the physical resource elements in the resource grid 1250.

Resource grid 1250 divides time 1240 and frequency 1238 resources into PRBs, e.g., PRB 1234. In one example, each PRB, e.g., PRB 1234, contains multiple modulated symbols (e.g., quadrature amplitude modulation (QAM) symbols) that may be transmitted over the air. The more PRBs assigned to a codeblock, the more bits the resource mapping maps from the CB's circular buffer to the resource grid 250. In one example, the RV index determines the start of the bit stream of a codeblock that resource mapping operation maps to the physical resources. In one example, the resource mapping operation maps the bit stream associated with CB0 to a subset of PRBs, e.g., PRBs in resource grid 1250, without hatching, and maps the bit stream associated with CB1 to a subset of PRBs, e.g., PRBs in resource grid 1250, with hatching. In one example, the PRBs associated with CB0 differ from PRBs associated with CB1.

Reducing the TB size reduces the number of codeblocks. For example, if the transport block without adjustment 1210 were encoded and mapped to resource grid 1250, it may be segmented into five codeblocks, which may be mapped to the five columns of PRBs, respectively. The first two columns of PRBs would include UL data, while the last three columns of PRBs would include all-zero padding. By reducing the TB size of the adjusted transport block 1216 and keeping the number of time-frequency resources the same, the number of codeblocks used for the adjusted transport block 1216 may be reduced to two. Thus, more resources will correspond to each of the reduced number of codeblocks. Therefore, the effective coding rate of each codeblock is decreased, and the lower the code rate, the higher the reliability of the transmission.

In one example, the UE 104 may indicate the newly selected MCS to the BS 108 in the UCI. It may be advantageous for the newly selected MCS or the number of layers to be known to both the BS 108 and the UE 104 to facilitate the computation of the updated TB size.

Figure 13:
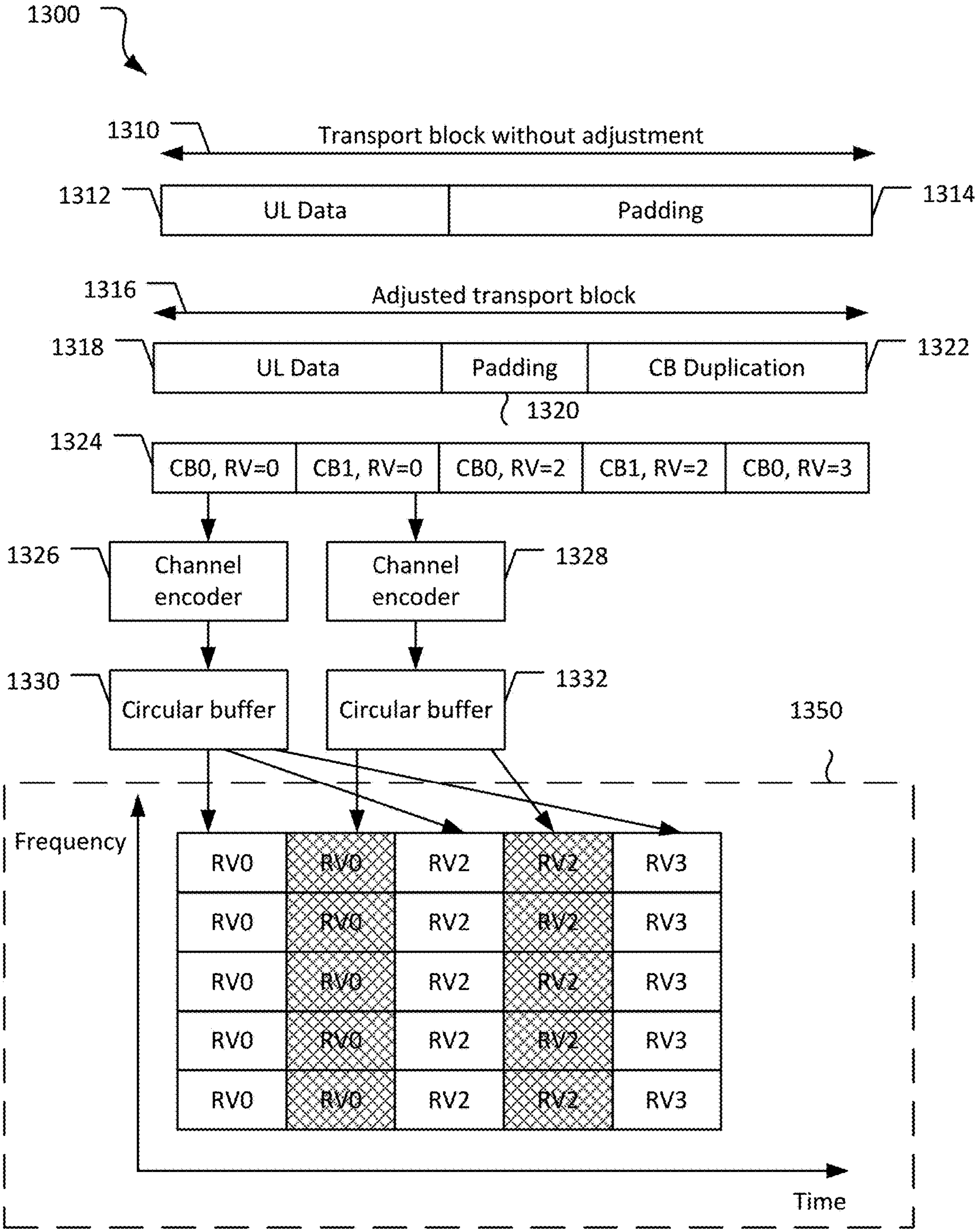
FIG. 13 illustrates an uplink grant adjustment in accordance with some embodiments.

FIG. 13 illustrates an uplink grant adjustment 1300 in accordance with some embodiments. The UL grant adjustment 1300 is an example of using UL grant adjustment to transmit important data with increased reliability.

A transport block without adjustment 1310 includes UL data 1312 and padding 1314. In one example, a codeblock segmentation operation may divide the transport block without adjustment 1310 into one or more CBs, such as that described above, with respect to FIG. 12.

The UL grant adjustment 1300 may modify the TB by using repetition with a different RV. Adjusted TB 1316 is an example of a modified TB. The adjusted TB 1316 may include UL data 1318, padding 1320, and CB duplication 1322. In one example, the size of padding 1320 is smaller than the size of padding 1314. The CB duplication 1322 may include codeblocks for duplicating the CBs associated with the UL data 1318. The duplication may occur with different RVs.

In one example, the codeblock segmentation operation divides the UL data 1318 and padding 1320 into codeblocks 1324. Codeblocks 1324 include CB0 and CB1 associated with UL data 1318 and padding 1320. The remaining codeblocks in 1324 are duplicates of CB0 and CB1 with different RVs.

In one example, channel encoder 1326 encodes codeblock CB0 and CB1 based on the MCS associated with CB0 and CB1, respectively. In one example, the encoded bits are written in their corresponding circular buffer, from where they are read, starting from the bit that corresponds to the RV of the CB. The channel encoding may only take place once for CB0 and CB1. The encoded bits may be written into respective circular buffers from where they are read, starting from the bit that corresponds to the RV of the CB.

For example, circular buffer 1330 may receive the encoded bits from channel encoder 1326, and circular buffer 1332 may receive the encoded bits from channel encoder 1328. Resource mapping operation maps the coded bits in circular buffers 1330 and 1332 to the physical resource elements in the resource grid 1350. The resource grid 1350 may be similar to resource grid 1250 described with respect to FIG. 12.

In one example, the resource mapping operation maps the bit stream associated with CB0 with redundancy version 0 (RV0) to a subset of PRBs, e.g., PRBs in resource grid 1350, marked with RV0 and without hatching. The resource mapping operation may map the bit stream associated with CB1 with RV0 to a subset of PRBs, e.g., PRBs in resource grid 1350, marked with RV0 with hatching. The resource mapping operation may map the bit stream associated with CB0 with redundancy version 2 (RV2) to a subset of PRBs, e.g., PRBs in resource grid 1350, marked with RV2 and without hatching. The resource mapping operation may map the bit stream associated with CB1 with RV2 to a subset of PRBs, e.g., PRBs in resource grid 1350, marked with RV2 with hatching. The resource mapping operation may map the bit stream associated with CB0 with redundancy version 3 (RV3) to a subset of PRBs, e.g., PRBs in resource grid 1350, marked with RV3 and without hatching. with CB1.

In one example, UL grant adjustment 1300 may repurpose the all-zero codeblocks to include different RV values of the data codeblocks that appear earlier in the TB. The selected RV index of the repurposed codeblocks may follow the next-in-order RV index. In one example, the next-in-order RV index is defined in 3GPP TS 36.213 and TS 38.213. In one example, the UL grant provided by the BS 108 may indicate the first RV index (e.g., RV0 as described above). In one example, the index of the first repurposed codeblock is known to the BS 108 and the UE 104. In one example, the base station configures the index of the first repurposed codeblock. In one example, the UE autonomously selects the index of the first repurposed codeblock and informs the base station by including the index of the first repurposed codeblock in the UL grant adjustment information.

Figure 14:
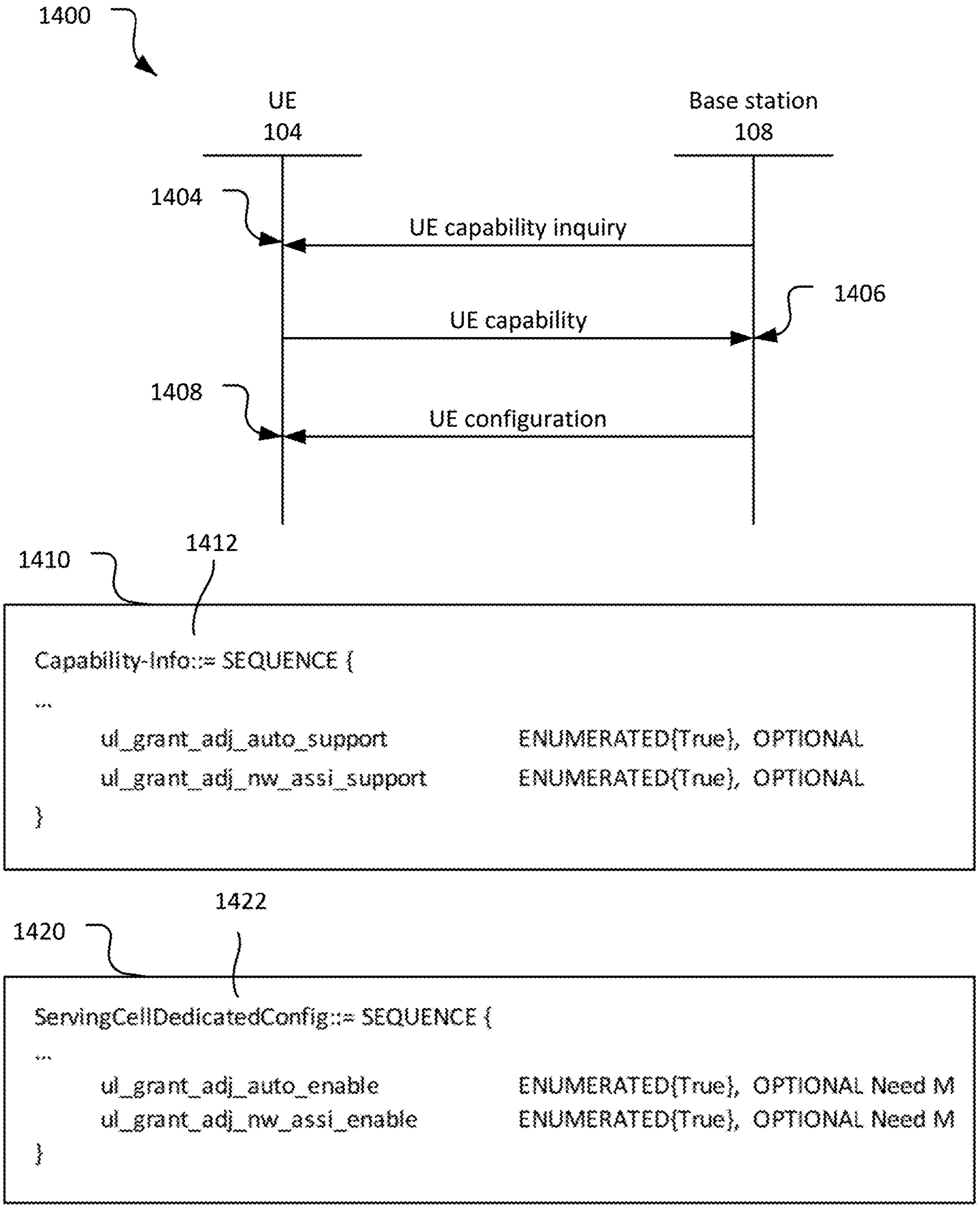
FIG. 14 illustrates a signaling diagram in accordance with some embodiments.

FIG. 14 illustrates a signaling diagram 1400 in accordance with some embodiments. The signaling diagram 1400 is an example of signaling UE capabilities and configurations with respect to UL grant adjustment.

In one example, at 1404, the BS 108 sends, and the UE 104 receives a request packet. The request packet may include a UE capability inquiry, by which the BS 108 requests the UE 104 to send its capabilities for supporting UL grant adjustment features to the BS 108.

In one example, at 1406, the UE 104 sends, and the BS 108 receives a UE capability message 1410. The UE capability message may include the UE capabilities for supporting UL grant adjustment features. In one example, the UE capability message may be transmitted by dedicated signaling. For example, the UE capability message may be an RRC message that the UE 104 sends to the BS 108.

The UE capability message 1410 may include the UE capabilities in a capability-info information element (IE) 1412. The capability-info IE 1412 may provide information associated with the capability of the UE 104 to perform UL grant adjustment. In one example, the capability-info IE 1412 includes an autonomous UL grant adjustment support (ul_grant_adj_auto_support) field to indicate whether the UE 104 can perform autonomous UL grant adjustment. In one example, a value of '1' or 'True' associated with the ul_grant_adj_auto_support field indicates that the UE 104 supports autonomous UL grant adjustment. In one example, a value of '0' or 'False' associated with ul_grant_adj_auto_support indicates that the UE 104 does not support autonomous UL grant adjustment.

In one example, the capability-info IE 1412 includes a network-assisted UL grant adjustment support (ul_grant_adj_nw_assi_support) field to indicate whether UE can perform network-assisted UL grant adjustment by sending a request to the BS for the UL grant adjustment. In one example, a value of '1' or 'True' associated with the ul_grant_adj_nw_assi_support field indicates that the UE 104 supports network-assisted UL grant adjustment. In one example, a value of '0' or 'False' associated with the ul_grant_adj_nw_assi_support field indicates that the UE 104 does not support network-assisted UL grant adjustment.

At 1408, the BS 108 may send, and the UE 104 may receive, a UE configuration message 1420. In one example, the UE configuration message 1420 may be transmitted via secured dedicated signaling. For example, the UE configuration message 1420 may be transmitted as an RRC configuration or an RRC reconfiguration message.

The UE configuration message 1420 sent at 1410 may include a serving cell dedicated configuration (ServingCellDedicatedConfig) IE 1422 with the relevant configuration information. The configuration information may configure the UE 104 to perform autonomous or network-assisted UL grant adjustment.

In one example, ServingCellDedicatedConfig IE 1422 may include an ul_grant_adj_auto_enable field to enable or disable the UE to perform autonomous UL grant adjustment. In one example, a value of '1' or 'True' associated with the ul_grant_adj_auto_enable field may enable the UE 104 to perform autonomous UL grant adjustment. In one example, a value of '0' or 'False' associated with the ul_grant_adj_auto_enable field may disable the UE 104 to perform autonomous UL grant adjustment.

In some embodiments, if the UE 104 has the capability to perform autonomous UL grant adjustment and is configured to perform autonomous UL grant adjustment by the network, it may monitor PDCCH search spaces for specific UL grant assignment messages that may activate the UL grant adjustment.

In one example, the ServingCellDedicatedConfig IE 1422 includes an ul_grant_nw_assis_enable field to enable or disable the UE to send a request to the BS for the UL grant adjustment. In one example, a value of '1' or 'True' associated with the ul_grant_nw_assis_enable field enables the UE 104 to perform network-assisted UL grant adjustment. In one example, a value of '0' or 'False' associated with the ul_grant_nw_assis_enable field disables the UE 104 to perform network-assisted UL grant adjustment. In one example, the UE 104 performing network-assisted UL grant adjustment includes requesting the network, e.g., BS 108, to adjust the UL grant as described elsewhere herein. In one example, the BS 108 receives, from the UE 104, a capability message.

In one example, the BS 108 sends, to the UE 104, a configuration to enable or disable the UE to perform a UL grant adjustment operation based on the capability message.

Figure 15:
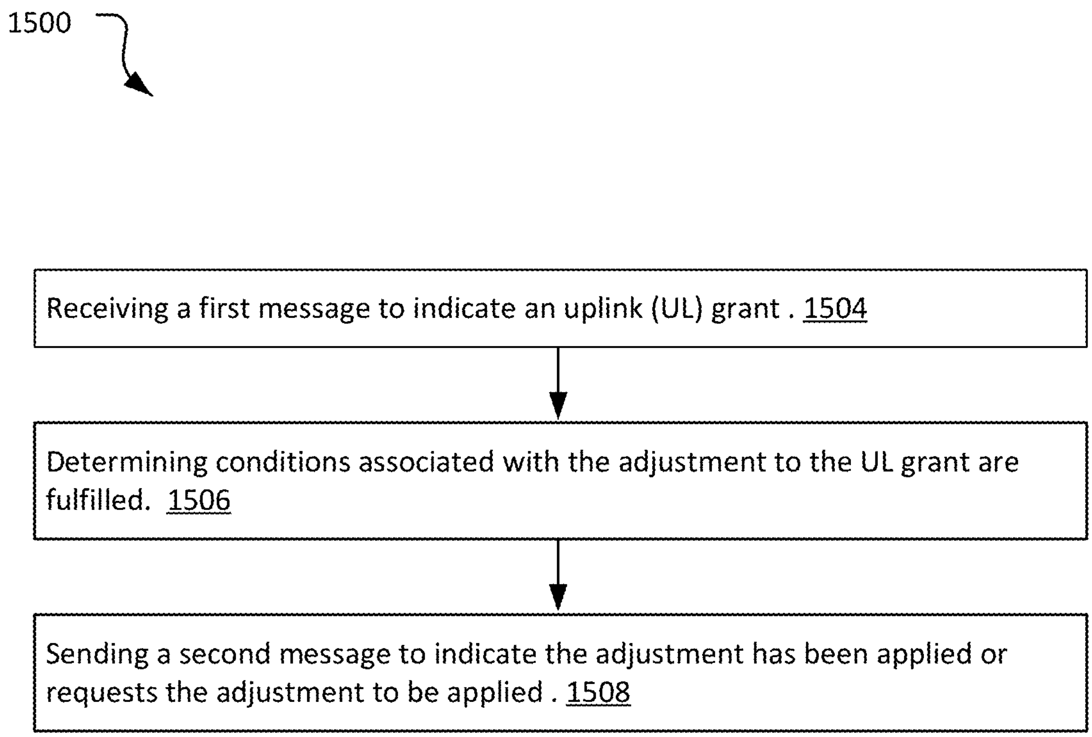
FIG. 15 illustrates an operational flow/algorithmic structure in accordance with some embodiments.

FIG. 15 illustrates an operational flow/algorithmic structure 1500 in accordance with some embodiments. Flow diagram 1500 is an example of the UL grant adjustment operation at the UE, e.g., the UE 104 in FIG. 1.

At 1504, the UE receives a UL grant message that indicates a UL grant. The UL grant allocates UL resources for the transmission of UL data. In some embodiments, the UL grant message may further indicate that UE network-assisted or autonomous UL grant adjustment is allowed.

At 1506, the UE determines whether the conditions associated with the adjustment to the UL grant are fulfilled. In one example, the conditions associated with the adjustment include UE capability, UE configuration, size of zero padding, and an indication of whether UL grant adjustment is allowed in the UL grant message. In some embodiments, the conditions include a first size of the UL resources allocated for transmission of the UL data exceeding, by a predetermined threshold, a second size of UL resources needed for transmission of the UL data using a transmission scheme associated with the UL grant.

When the conditions associated with the adjustment to the UL grant are fulfilled, the UE may perform the operations described at 1508.

At 1508, the UE sends a message to the base station. The message indicates whether the UE has applied the UL grant adjustment or requests the base station to perform the UL grant adjustment. If the message indicates the UE has applied the UL grant adjustment, the message may include UL grant adjustment information. The UL grant adjustment information may include a first indication to indicate that the adjustment to the UL grant has been applied and may include one or more second indications to indicate specific adjustments associated with a respective one or more uplink data sets. The UE may send an adjusted UL TB with the UL data based on the adjustment applied to the UL grant. The adjusted UL TB may be sent in the same message as the UL grant adjustment information or in different messages. In some embodiments, the UL grant adjustment information may be transmitted using dedicated UL resources that are predefined or assigned in DCI, which may be included in the first message received at 1504 or in another message.

In the event the message requests the base station to perform the UL grant adjustment, the UE may also provide an indication of the type or degree of adjustment that is requested. For example, the message may indicate an amount of extra bytes in the UL grant or the size of a portion of the UL data that is to be transmitted with a reliability greater than a predetermined threshold.

In some embodiments, the adjusted UL grant may be associated with a transmission scheme or UL grant size that varies from a transmission scheme or UL grant size associated with the original UL grant. In some embodiments, the adjusted UL grant may be designed to reduce or eliminate an amount of padding transmitted with the UL data or may be designed to increase the reliability of some or a portion of the UL data. Various parameters of the transmission scheme may be adjusted for these purposes. These parameters may include but are not limited to, an MCS, a number of antenna ports, a number of codeblocks with new data, an FDRA, or a TDRA.

Figure 16:
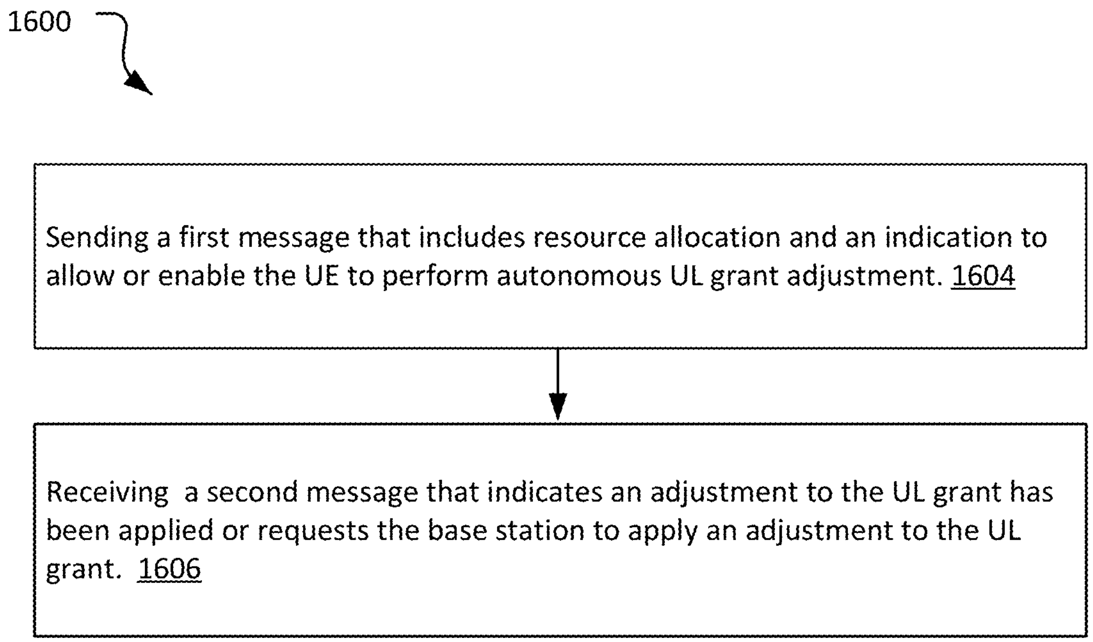
FIG. 16 illustrates an operational flow/algorithmic structure in accordance with some embodiments.

FIG. 16 illustrates an operational flow/algorithmic structure 1600 in accordance with some embodiments. Flow diagram 1600 is an example of the UL grant adjustment operation at the base station, e.g., the BS 108 in FIG. 1.

At 1604, the base station sends a grant message. In one example, the grant message includes an indication to allow or enable the UE to perform autonomous UL grant adjustment. The grant message transmitted by the base station may be similar to the grant message received by the UE at 1504, as described above with respect to FIG. 15 and elsewhere herein.

At 1606, the base station receives a message from the UE.

In one example, the message indicates that UE has applied an adjustment to the UL grant. The indication may include UL grant adjustment information that the base station uses to decode the UL data. The operation of the base station in this instance may be similar to aspects discussed elsewhere herein with respect to UE autonomous UL grant adjustment.

In one example, the message indicates that the UE requests the base station to apply an adjustment to the UL grant. The base station may adjust the UL grant and provide the UE with an indication of the adjustment. The operation of the base station in this instance may be similar to aspects discussed elsewhere herein with respect to network-assisted UL grant adjustment.

Figure 17:
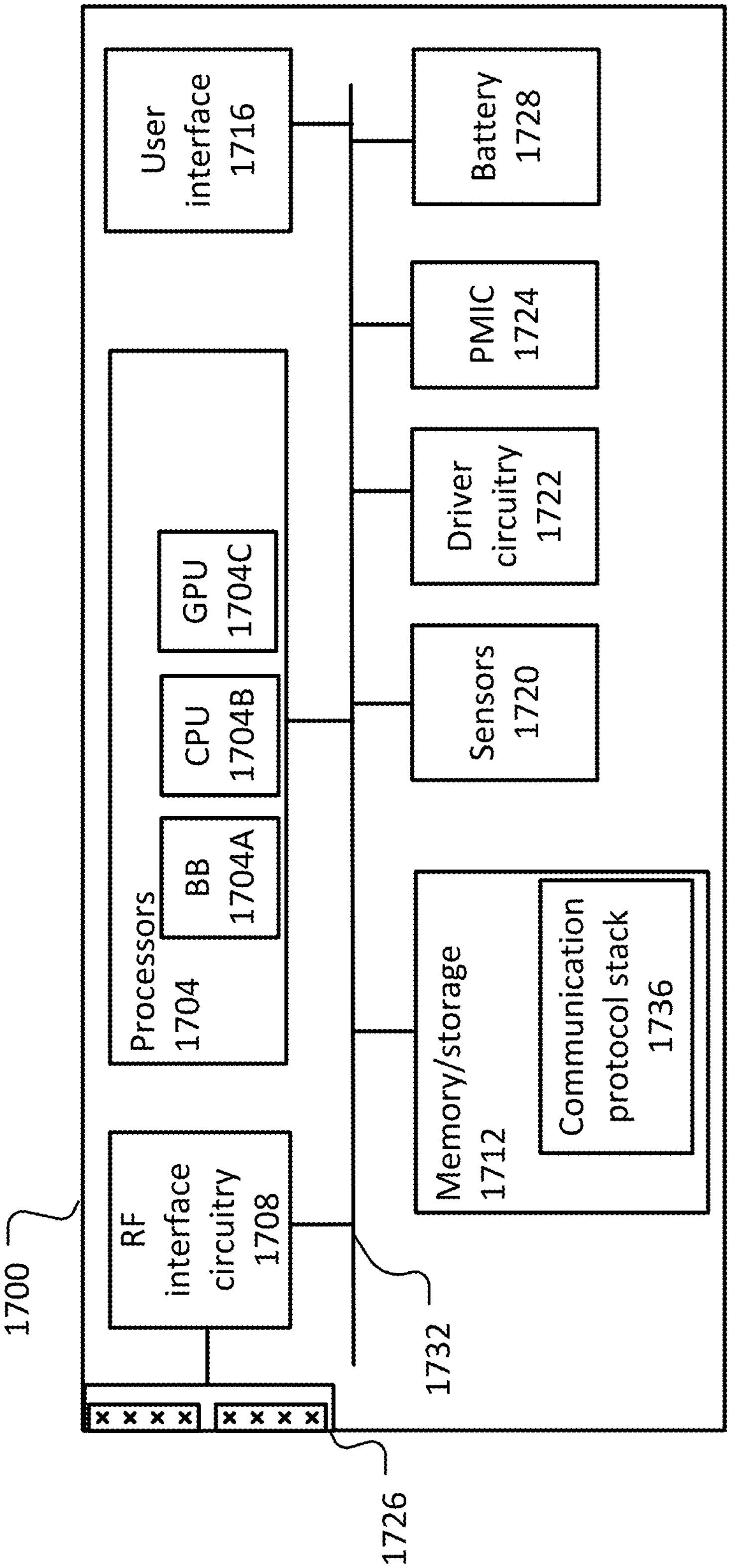
FIG. 17 illustrates a user equipment in accordance with some embodiments.

FIG. 17 illustrates a UE 1700 in accordance with some embodiments. The UE 1700 may be similar to and substantially interchangeable with the UE 104 of FIG. 1.

The UE 1700 may be any mobile or non-mobile computing device, such as, for example, a mobile phone, computer, tablet, XR device, glasses, industrial wireless sensor (for example, microphone, carbon dioxide sensor, pressure sensor, humidity sensor, thermometer, motion sensor, accelerometer, laser scanner, fluid level sensor, inventory sensor, electric voltage/current meter, or actuator), video surveillance/monitoring device (for example, camera or video camera), wearable device (for example, a smartwatch), or Internet-of-things device.

The UE 1700 may include processors 1704, RF interface circuitry 1708, memory/storage 1712, user interface 1716, sensors 1720, driver circuitry 1722, power management integrated circuit (PMIC) 1724, antenna structure 1726, and battery 1728. The components of the UE 1700 may be implemented as integrated circuits (ICs), portions thereof, discrete electronic devices, or other modules, logic, hardware, software, firmware, or a combination thereof. The block diagram of FIG. 17 is intended to show a high-level view of some of the components of the UE 1700. However, some of the components shown may be omitted, additional components may be present, and different arrangements of the components shown may occur in other implementations.

The components of the UE 1700 may be coupled with various other components over one or more interconnects 1732, which may represent any type of interface, input/output, bus (local, system, or expansion), transmission line, trace, or optical connection that allows various circuit components (on common or different chips or chipsets) to interact with one another.

The processors 1704 may include processor circuitry such as, for example, baseband processor circuitry (BB) 1704A, central processor unit circuitry (CPU) 1704B, and graphics processor unit circuitry (GPU) 1704C. The processors 1704 may include any type of circuitry or processor circuitry that executes or otherwise operates computer-executable instructions, such as program code, software modules, or functional processes from memory/storage 1712 to cause the UE 1700 to perform UL grant adjustment operations as described herein.

In one example, processors 1704 receive a first message to indicate a UL grant. Processors 1704 determine conditions associated with the adjustment to the UL grant are fulfilled and makes UE send a second message to the base station. In one example, the second message indicates that the UE has applied an adjustment to the UL grant. In one example, the second message requests the base station to apply an adjustment to the UL grant.

In some embodiments, the baseband processor circuitry 1704A may access a communication protocol stack 1736 in the memory/storage 1712 to communicate over a 3GPP-compatible network. In general, the baseband processor circuitry 1704A may access the communication protocol stack 1736 to: perform user plane functions at a PHY layer, MAC layer, RLC sublayer, PDCP sublayer, SDAP sublayer, and upper layer; and perform control plane functions at a PHY layer, MAC layer, RLC sublayer, PDCP sublayer, RRC layer, and a NAS layer. In some embodiments, the PHY layer operations may additionally/alternatively be performed by the components of the RF interface circuitry 1708.

The baseband processor circuitry 1704A may generate or process baseband signals or waveforms that carry information in 3GPP-compatible networks. In some embodiments, the waveforms for NR may be based on the cyclic prefix OFDM (CP-OFDM) in the uplink or downlink, and discrete Fourier transform spread OFDM (DFT-S-OFDM) in the uplink.

The memory/storage 1712 may include one or more non-transitory, computer-readable media that includes instructions (for example, the communication protocol stack 1736) that may be executed by one or more of the processors 1704 to cause the UE 1700 to perform various operations described herein. The memory/storage 1712 includes any type of volatile or non-volatile memory that may be distributed throughout the UE 1700. In some embodiments, some of the memory/storage 1712 may be located on the processors 1704 themselves (for example, L1 and L2 cache), while other memory/storage 1712 is external to the processors 1704 but accessible thereto via a memory interface. The memory/storage 1712 may include any suitable volatile or non-volatile memory such as, but not limited to, dynamic random access memory (DRAM), static random access memory (SRAM), erasable programmable read-only memory (EPROM), electrically erasable programmable read-only memory (EEPROM), Flash memory, solid-state memory, or any other type of memory device technology.

The RF interface circuitry 1708 may include transceiver circuitry and a radio frequency front module (RFEM) that allows the UE 1700 to communicate with other devices over a radio access network. The RF interface circuitry 1708 may include various elements arranged in transmit or receive paths. These elements may include, for example, switches, mixers, amplifiers, filters, synthesizer circuitry, and control circuitry.

In the receive path, the RFEM may receive a radiated signal from an air interface via antenna structure 1726 and proceed to filter and amplify (with a low-noise amplifier) the signal. The signal may be provided to a receiver of the transceiver that down-converts the RF signal into a baseband signal that is provided to the baseband processor of the processors 1704.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1726.

In various embodiments, the RF interface circuitry 1708 may be configured to transmit/receive signals in a manner compatible with NR access technologies.

The antenna 1726 may include antenna elements to convert electrical signals into radio waves to travel through the air and to convert received radio waves into electrical signals. The antenna elements may be arranged into one or more antenna panels. The antenna 1726 may have antenna panels that are omnidirectional, directional, or a combination thereof to enable beamforming and multiple input, multiple output communications. The antenna 1726 may include microstrip antennas, printed antennas fabricated on the surface of one or more printed circuit boards, patch antennas, or phased array antennas. The antenna 1726 may have one or more panels designed for specific frequency bands, including bands in FR1 or FR2.

The user interface circuitry 1716 includes various input/output (I/O) devices designed to enable user interaction with the UE 1700. The user interface 1716 includes input device circuitry and output device circuitry. Input device circuitry includes any physical or virtual means for accepting an input, including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual displays, including, inter alia, one or more simple visual outputs/indicators (for example, binary status indicators such as light emitting diodes (LEDs)) and multi-character visual outputs, or more complex outputs such as display devices or touchscreens (for example, liquid crystal displays (LCDs), LED displays, quantum dot displays, and projectors), with the output of characters, graphics, multimedia objects, and the like being generated or produced from the operation of the UE 1700.

The sensors 1720 may include devices, modules, or subsystems whose purpose is to detect events or changes in its environment and send the information (sensor data) about the detected events to some other device, module, or subsystem. Examples of such sensors include inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; and microphones or other like audio capture devices.

The driver circuitry 1722 may include software and hardware elements that operate to control particular devices that are embedded in the UE 1700, attached to the UE 1700, or otherwise communicatively coupled with the UE 1700. The driver circuitry 1722 may include individual drivers allowing other components to interact with or control various I/O devices that may be present within or connected to the UE 1700. For example, the driver circuitry 1722 may include circuitry to facilitate the coupling of a universal integrated circuit card (UICC) or a universal subscriber identity module (USIM) to the UE 1700. For additional examples, driver circuitry 1722 may include a display driver to control and allow access to a display device, a touchscreen driver to control and allow access to a touchscreen interface, sensor drivers to obtain sensor readings of sensor circuitry 1720 and control and allow access to sensor circuitry 1720, drivers to obtain actuator positions of electro-mechanic components or control and allow access to the electro-mechanic components, a camera driver to control and allow access to an embedded image capture device, audio drivers to control and allow access to one or more audio devices.

The PMIC 1724 may manage the power provided to various components of the UE 1700. In particular, with respect to the processors 1704, the PMIC 1724 may control power-source selection, voltage scaling, battery charging, or DC-to-DC conversion.

In some embodiments, the PMIC 1724 may control or otherwise be part of various power-saving mechanisms of the UE 1700, including DRX, as discussed herein.

A battery 1728 may power the UE 1700, although, in some examples, the UE 1700 may be mounted and deployed in a fixed location and may have a power supply coupled to an electrical grid. The battery 1728 may be a lithium-ion battery, a metal-air battery, such as a zinc-air battery, an aluminum-air battery, a lithium-air battery, and the like. In some implementations, such as in vehicle-based applications, the battery 1728 may be a typical lead-acid automotive battery.

Figure 18:
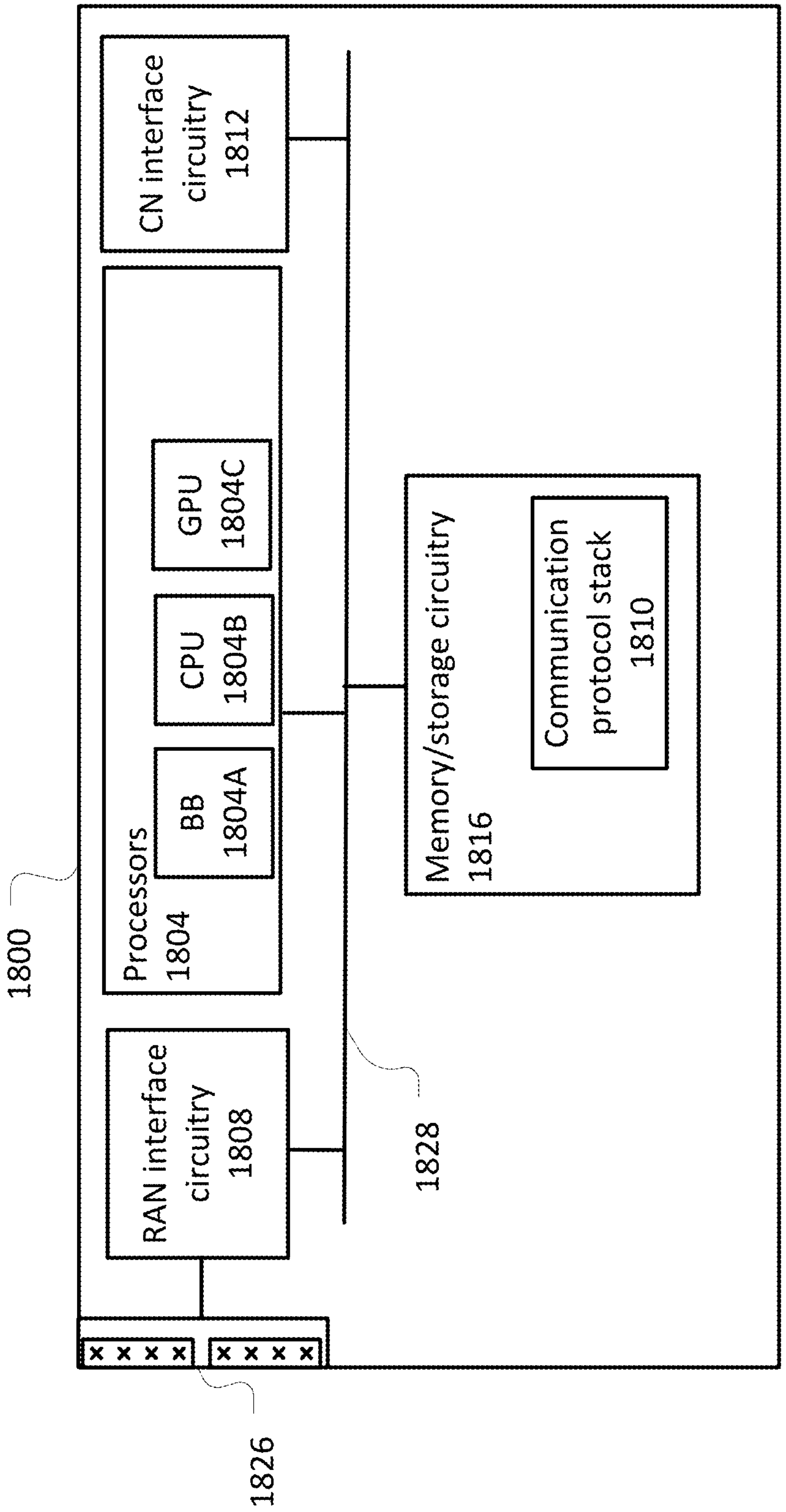
FIG. 18 illustrates a network node in accordance with some embodiments.

FIG. 18 illustrates a network node 1800 in accordance with some embodiments. The network node 1800 may be similar to and substantially interchangeable with the BS 108.

The network node 1800 may include processors 1804, RF interface circuitry 1808 (if implemented as an access node), the core network (CN) interface circuitry 1812, memory/storage circuitry 1816, and antenna structure 1826.

The components of the network node 1800 may be coupled with various other components over one or more interconnects 1828.

The processors 1804, RF interface circuitry 1808, memory/storage circuitry 1816 (including communication protocol stack 1810), antenna structure 1826, and interconnects 1828 may be similar to like-named elements shown and described with respect to FIG. 17.

The processors 1804 may cause the network node 1800 to perform UL grant adjustment operations as described herein. In one example, processor 1804 cause the network node 1800 to send a first message to the UE, e.g., the UE 104 in FIG. 1 or UE 1700 in FIG. 17, to indicate a UL grant. In one example, the first message enables the UE to perform autonomous UL grant adjustment. In one example, the processors 1804 receive a second message from the UE. In one example, the second message indicates that UE has applied an adjustment to the UL grant. In one example, the second message requests the network node 1800 to apply an adjustment to the UL grant.

The CN interface circuitry 1812 may provide connectivity to a core network, for example, a 5th Generation Core network (5GC) using a 5GC-compatible network interface protocol such as carrier Ethernet protocols or some other suitable protocol. Network connectivity may be provided to/from the network node 1800 via a fiber optic or wireless backhaul. The CN interface circuitry 1812 may include one or more dedicated processors or FPGAs to communicate using one or more of the aforementioned protocols. In some implementations, the CN interface circuitry 1812 may include multiple controllers to provide connectivity to other networks using the same or different protocols.

In some embodiments, the network node 1800 may be coupled with transmit-receive points (TRPs) using the antenna structure 1826, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more aspects, at least one of the components set forth in one or more of the preceding figures may be configured to perform one or more operations, techniques, processes, or methods as set forth in the example section below. For example, the baseband circuitry, as described above in connection with one or more of the preceding figures, may be configured to operate in accordance with one or more of the examples set forth below. For another example, circuitry associated with a UE, base station, network element, etc., as described above in connection with one or more of the preceding figures, may be configured to operate in accordance with one or more of the examples set forth below in the example section.

Examples

In the following sections, further exemplary aspects are provided.

Example 1 includes a method of operating a user equipment (UE) in a wireless communications system, the method including: receiving, from a base station, a first message to indicate an uplink (UL) grant, the UL grant to include UL resources allocated for transmission of UL data; determining one or more conditions associated with an adjustment to the UL grant are fulfilled; and sending, to the base station, a second message to indicate the adjustment to the UL grant has been applied or to request that the adjustment to the UL grant be applied.

Example 2 includes the method of example 1 or some other example herein, wherein the first message is to further indicate that UE autonomous UL grant adjustment is allowed.

Example 3 includes the method of examples 1 or 2 or some other example herein, wherein the second message includes UL grant adjustment information having a first indication to indicate the adjustment to the UL grant has been applied and one or more second indications to indicate adjustments associated with a respective one or more uplink data sets.

Example 4 includes the method of any of examples 1-3 or some other example herein, wherein the one or more conditions include a first size of the UL resources allocated for transmission of the UL data exceeding, by a predetermined threshold, a second size of UL resources needed for transmission of the UL data using a transmission scheme associated with the UL grant.

Example 5 includes the method of any of examples 1-4 or some other example herein, wherein the second message includes UL grant adjustment information to indicate the adjustment to the UL grant has been applied, the second message uses dedicated UL resources that are predefined or assigned in the downlink control information or in the first message and the method further includes: generating an adjusted UL transport block (TB) with the UL data based on the adjustment to the UL grant; and transmitting the adjusted UL TB in a third message using dedicated UL resources that are predefined or assigned in downlink control information in the first message.

Example 6 includes the method of any of examples 1-5 or some other example herein, wherein the second message includes UL grant adjustment information to indicate the adjustment to the UL grant has been applied and the method further includes: generating an adjusted UL transport block (TB) with the UL data based on the adjustment to the UL grant; and transmitting the adjusted UL TB with the UL grant adjustment information in the second message.

Example 7 includes the method of any of examples 1-6 or some other example herein, wherein the second message is to request that the adjustment to the UL grant be applied and further indicates an amount of extra bytes in the UL grant or a size of a portion of the UL data that is to be transmitted with a reliability greater than a predetermined threshold.

Example 8 includes the method of any of examples 1-7 or some other example herein, wherein the UL grant is associated with a first UL grant size and a first transmission scheme and the method further includes: receiving, from the base station, a third message to indicate an adjusted UL grant, wherein the adjusted UL grant includes a second UL grant size and a second transmission scheme, wherein the second UL grant size is different from the first UL grant size or the second transmission scheme is different from first transmission scheme.

Example 9 includes the method of any of examples 1-8 or some other example herein, wherein the UL data comprises first data associated with a first priority and second data associated with a second priority that is greater than the first priority, and the adjustment to the UL grant is to change a transmission scheme or a repetition number associated with the second data to increase reliability of transmission of the second data.

Example 10 includes the method of any of examples 1-9 or some other example herein, wherein the UL grant is associated with a first transmission scheme that is to generate a transmission, for the UL resources, having a first non-padding portion and a first padding portion, and the adjustment to the UL grant is to provide an adjusted UL grant with a second transmission scheme that is to generate a transmission, for the UL resources, having a second non-padding portion that is greater than the first non-padding portion.

Example 11 includes the method of any of examples 1-10 or some other example herein, wherein the first transmission scheme includes first parameters associated with a first reliability of transmission of the UL data and the second transmission scheme includes second parameters associated with a second reliability of transmission of the UL data, wherein the second reliability is greater than the first reliability.

Example 12 includes the method of any of examples 1-11 or some other example herein, wherein: the first parameters includes a first modulation and coding scheme (MCS) and the second parameters includes a second MCS; or the first parameters are to cause transmission of the UL data with a first number of repetitions and the second parameters are to cause transmission of the UL data with a second number of repetitions that is greater than the first number of repetitions.

Example 13 includes the method of any of examples 1-12 or some other example herein, wherein: the UL grant is associated with a first transmission scheme to be used to transmit the UL data; and the adjustment to the UL grant is to provide an adjusted UL grant associated with a second transmission scheme to be used to transmit the UL data, wherein the second transmission scheme includes at least one parameter that is different from a corresponding parameter of the first transmission scheme.

Example 14 includes the method of any of examples 1-13 or some other example herein, wherein the at least one parameter is a modulation and coding scheme, a number of antenna ports, or a number of codeblocks with new data.

Example 15 includes the method of any of examples 1-14 or some other example herein, wherein: the UL resources are first UL resources having a first frequency-domain resource assignment (FDRA) and a first time-domain resource assignment (TDRA); the adjustment to the UL grant is to provide an adjusted UL grant associated with second UL resources having a second FDRA and a second TDRA; and the first FDRA is different from the second FDRA or the first TDRA is different from the second TDRA.

Example 16 includes a method of operating a base station in a wireless communications system, the method including: sending, to a user equipment (UE), a first message to indicate an uplink (UL) grant, the UL grant to include UL resources allocated for transmission of UL data; and receiving, from the UE, a second message to indicate an adjustment to the UL grant has been applied or to request that an adjustment to the UL grant be applied.

Example 17 includes the method of example 16 or some other example herein, wherein the first message is to further enable or disable the UE to perform an autonomous UL grant adjustment.

Example 18 includes the method of examples 16 or 17 or some other example herein, wherein the second message includes UL grant adjustment information having a first indication to indicate the adjustment to the UL grant has been applied and one or more second indications to indicate adjustments associated with a respective one or more uplink data sets.

Example 19 includes the method of any of examples 16-18 or some other example herein, wherein the second message uses dedicated UL resources that are predefined or assigned in the downlink control information or in the first message and includes UL grant adjustment information to indicate the adjustment to the UL grant has been applied, and the method further includes: receiving an adjusted UL transport block (TB) in a third message using dedicated UL resources that are predefined or assigned in downlink control information transmitted to the UE, wherein the adjusted UL TB is generated with the UL data based on the adjustment to the UL grant.

Example 20 includes the method of any of examples 16-19 or some other example herein, wherein the second message includes UL grant adjustment information to indicate the adjustment to the UL grant has been applied and the method further includes: receiving an adjusted UL transport block (TB) with the UL grant adjustment information in the second message, wherein the adjusted UL TB is generated with the UL data based on the adjustment to the UL grant; decoding the UL grant adjustment information; and decoding the adjusted UL TB based on said decoding of the UL grant adjustment information.

Example 21 includes the method of any of examples 16-20 or some other example herein, wherein the second message is to request that the adjustment to the UL grant be applied and further indicates an amount of extra bytes in the UL grant or a size of a portion of the UL data that is to be transmitted with a reliability greater than a predetermined threshold.

Example 22 includes the method of any of examples 16-21 or some other example herein, wherein the UL grant is associated with a first UL grant size and a first transmission scheme and the method further includes: transmitting, to the UE, a third message to indicate an adjusted UL grant, wherein the adjusted UL grant includes a second UL grant size and a second transmission scheme, wherein the second UL grant size is different from the first UL grant size or the second transmission scheme is different from first transmission scheme.

Example 23 includes the method of any of examples 16-22 or some other example herein, further includes: scheduling transmission of the UL data K seconds after sending the UL grant in the first message, K seconds to provide the UE sufficient time for: sending the second message, receiving and processing the third message, and processing the UL data.

Example 24 includes the method of any of examples 16-23 or some other example herein, wherein the UL data comprises first data associated with a first priority and second data associated with a second priority that is greater than the first priority, and the adjustment to the UL grant is to change a transmission scheme or a repetition number associated with the second data to increase reliability of transmission of the second data.

Example 25 includes the method of any of examples 16-24 or some other example herein, wherein the UL grant is associated with a first transmission scheme that is to generate a transmission, for the UL resources, having a first non-padding portion and a first padding portion, and the adjustment to the UL grant is to provide an adjusted UL grant with a second transmission scheme that is to generate a transmission, for the UL resources, having a second non-padding portion that is greater than the first non-padding portion.

Example 26 includes the method of any of examples 16-25 or some other example herein, wherein the first transmission scheme includes first parameters associated with a first reliability of transmission of the UL data and the second transmission scheme includes second parameters associated with a second reliability of transmission of the UL data, wherein the second reliability is greater than the first reliability.

Example 27: the method of any of examples 16-26, wherein: the first parameters includes a first modulation and coding scheme (MCS) and the second parameters includes a second MCS; or the first parameters are to cause transmission of the UL data with a first number of repetitions and the second parameters are to cause transmission of the UL data with a second number of repetitions that is greater than the first number of repetitions.

Example 28 includes the method of any of examples 16-27 or some other example herein, wherein the UE is a first UE, the UL resources include a first part and a second part, the second message indicates a request that the adjustment to the UL grant be applied, and the method further includes: generate, based on the request, an adjusted UL grant to allocate the first part of the UL resources to the first UE; generate an additional UL grant to allocate the second part of the UL resources to a second UE; sending first downlink control information (DCI) to provide the adjusted UL grant to the first UE; and sending second DCI to provide the additional UL grant to the second UE.

Example 29 includes the method of any of examples 16-28 or some other example herein, wherein: the UL grant is associated with a first transmission scheme to be used to transmit the UL data; and the adjustment to the UL grant is to provide an adjusted UL grant associated with a second transmission scheme to be used to transmit the UL data, wherein the second transmission scheme includes a at least one parameter that is different from a corresponding parameter of the first transmission scheme.

Example 30 includes the method of any of examples 16-29 or some other example herein, wherein the at least one parameter is a modulation and coding scheme, a number of antenna ports, or a number of codeblocks with new data.

Example 31: the method of any of examples 16-30, wherein: the UL resources are first UL resources having a first frequency-domain resource assignment (FDRA) and a first time-domain resource assignment (TDRA); the adjustment to the UL grant is to provide an adjusted UL grant associated with second UL resources having a second FDRA and a second TDRA; and the first FDRA is different from the second FDRA or the first TDRA is different from the second TDRA.

Example 32: the method of any of examples 16-31, further includes: receiving, from the UE, a capability message, the capability message to include a first capability parameter to indicate whether the UE is capable of performing autonomous UL grant adjustment or not, and a second capability parameter to indicate whether the UE is capable of initiating the UL grant adjustment by sending a request to the base station for the UL grant adjustment.

Example 33: the method of any of examples 16-32, further includes: sending, to the UE, a configuration to enable or disable the UE to perform a UL grant adjustment operation based on the capability message, wherein the configuration include a first configuration parameter to enable or disable the UE to perform autonomous UL grant adjustment, and a second configuration parameter to enable or disable the UE to send a request to the base station for the UL grant adjustment.

Another example may include an apparatus comprising logic, modules, or circuitry to perform one or more elements of a method described in or related to any of examples 1-33, or any other method or process described herein.

Another example may include a method, technique, or process as described in or related to any of examples 1-33, or portions or parts thereof.

Another example may include an apparatus comprising: one or more processors and one or more computer-readable media comprising instructions that, when executed by the one or more processors, cause the one or more processors to perform the method, techniques, or process as described in or related to any of examples 1-33, or portions thereof.

Another example include a signal as described in or related to any of examples 1-33, or portions or parts thereof.

Another example may include a datagram, information element, packet, frame, segment, PDU, or message as described in or related to any of examples 1-33, or portions or parts thereof, or otherwise described in the present disclosure.

Another example may include a signal encoded with data as described in or related to any of examples 1-33, or portions or parts thereof, or otherwise described in the present disclosure.

Another example may include a signal encoded with a datagram, IE, packet, frame, segment, PDU, or message as described in or related to any of examples 1-33, or portions or parts thereof, or otherwise described in the present disclosure.

Another example may include an electromagnetic signal carrying computer-readable instructions, wherein execution of the computer-readable instructions by one or more processors is to cause the one or more processors to perform the method, techniques, or process as described in or related to any of examples 1-33, or portions thereof.

Another example may include a computer program comprising instructions, wherein execution of the program by a processing element is to cause the processing element to carry out the method, techniques, or process as described in or related to any of examples 1-33, or portions thereof.

Another example may include a signal in a wireless network as shown and described herein.

Another example may include a method of communicating in a wireless network as shown and described herein.

Another example may include a system for providing wireless communication as shown and described herein.

Another example may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of aspects to the precise form disclosed. Modifications and variations are possible in light of the above teachings or may be acquired from practice of various aspects.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:

processing a first message received from a base station, the first message to indicate an uplink (UL) grant associated with UL resources allocated for transmission of UL data;

determining that a condition associated with an adjustment to the UL grant is fulfilled;

generating a second message to be sent to the base station in dedicated UL resources that are predefined or assigned in a downlink control information, the second message includes UL grant adjustment information to indicate that the adjustment to the UL grant has been applied;

generating an adjusted UL transport block (TB) with the UL data based on the adjustment to the UL grant; and outputting the adjusted UL TB for transmission in a third message.

2. The method of claim 1, wherein the first message is to further indicate that a user equipment (UE) autonomous UL grant adjustment is allowed.

3. The method of claim 1, wherein the UL grant adjustment information includes a first indication to indicate the adjustment to the UL grant has been applied and one or more second indications to indicate adjustments associated with a respective one or more uplink data sets.

4. The method of claim 1, wherein the condition include a first size of the UL resources allocated for transmission of the UL data exceeding, by a predetermined threshold, a second size of UL resources needed for transmission of the UL data using a transmission scheme associated with the UL grant.

5. The method of claim 1, further comprising:

generating, for transmission to the base station, a capability message including a first capability parameter indicating whether a user equipment (UE) is capable of performing autonomous UL grant adjustment, and a second capability parameter indicating whether the UE is capable of initiating the UL grant adjustment by sending a request to the network element for the UL grant adjustment; and receiving, from the base station, a configuration to enable or disable the UE to perform a UL grant adjustment operation based on the capability message, wherein the configuration includes a first configuration parameter to enable or disable the UE to perform an autonomous UL grant adjustment, and a second configuration parameter to enable or disable the UE to send a request to the network element for the UL grant adjustment.

6. An apparatus comprising:

processing circuitry to:

process a first message received from a base station, the first message to indicate an uplink (UL) grant associated with UL resources allocated for transmission of UL data;

determine that a condition associated with an adjustment to the UL grant is fulfilled; and generate a second message to be sent to the base station, wherein the second message is to request that the adjustment to the UL grant be applied, and wherein the second message indicates an amount of extra bytes in the UL grant or a size of a portion of the UL data that is to be transmitted with a reliability greater than a predetermined threshold; and interface circuitry, coupled with the processing circuitry, the interface circuitry to receive the first message.

7. The apparatus of claim 6, wherein the UL grant is associated with a first UL grant size and a first transmission scheme and the processing circuitry is further to:

process a third message received from the base station, the third message to indicate an adjusted UL grant, wherein the adjusted UL grant includes a second UL grant size and a second transmission scheme, wherein the second UL grant size is different from the first UL grant size or the second transmission scheme is different from first transmission scheme.

8. The apparatus of claim 6, wherein the processing circuitry is further to:

generate, for transmission to the base station, a capability message including a first capability parameter indicating whether a user equipment (UE) is capable of performing autonomous UL grant adjustment, and a second capability parameter indicating whether the UE is capable of initiating the UL grant adjustment by sending a request to the network element for the UL grant adjustment; and receive, from the base station, a configuration to enable or disable the UE to perform a UL grant adjustment operation based on the capability message, wherein the configuration includes a first configuration parameter to enable or disable the UE to perform an autonomous UL grant adjustment, and a second configuration parameter to enable or disable the UE to send a request to the network element for the UL grant adjustment.

9. A method comprising:

generating, for transmission to a user equipment (UE), a first message to indicate an uplink (UL) grant associated with UL resources allocated for transmission of UL data;

receiving, from the UE, a second message to indicate an adjustment to the UL grant has been applied or to request that an adjustment to the UL grant be applied;

receiving, from the UE, a capability message, the capability message to include a first capability parameter indicating whether the UE is capable of performing autonomous UL grant adjustment, and a second capability parameter indicating whether the UE is capable of initiating the UL grant adjustment by sending a request to a network element for the UL grant adjustment; and generating, for transmission to the UE, a configuration to enable or disable the UE to perform a UL grant adjustment operation based on the capability message, wherein the configuration includes a first configuration parameter to enable or disable the UE to perform an autonomous UL grant adjustment, and a second configuration parameter to enable or disable the UE to send a request to the network element for the UL grant adjustment.

10. The method of claim 9, wherein the first message is to further enable or disable the UE to perform an autonomous UL grant adjustment.

11. The method of claim 9, wherein the second message uses dedicated UL resources that are predefined or assigned in a downlink control information and includes UL grant adjustment information having a first indication to indicate the adjustment to the UL grant has been applied and one or more second indications to indicate adjustments associated with a respective one or more uplink data sets.

12. The method of claim 9, wherein the second message includes UL grant adjustment information to indicate the adjustment to the UL grant has been applied and the method further comprises:

receiving an adjusted UL transport block (TB) with the UL grant adjustment information in the second message, wherein the adjusted UL TB is generated with the UL data based on the adjustment to the UL grant;

decoding the UL grant adjustment information; and decoding the adjusted UL TB based on said decoding of the UL grant adjustment information.

13. The method of claim 9, wherein the second message is to request that the adjustment to the UL grant be applied and further indicates an amount of extra bytes in the UL grant or a size of a portion of the UL data that is to be transmitted with a reliability greater than a predetermined threshold.

14. The method of claim 13, wherein the UL grant is associated with a first UL grant size and a first transmission scheme and the method further comprises:

transmitting, to the UE, a third message to indicate an adjusted UL grant, wherein the adjusted UL grant includes a second UL grant size and a second transmission scheme, wherein the second UL grant size is different from the first UL grant size or the second transmission scheme is different from first transmission scheme.

* * * * *